United States Patent

Olig

[11] 4,074,177
[45] Feb. 14, 1978

[54] METHODS AND APPARATUS FOR AUTOMATIC MOVEMENT OF A MEMBER TO PRECISELY INDEXED POSITIONS DESPITE SIGNAL DRIFT OR OFFSET

[75] Inventor: Eugene A. Olig, Fond du Lac, Wis.

[73] Assignee: Giddings & Lewis, Inc., Fond du Lac, Wis.

[21] Appl. No.: 596,586

[22] Filed: July 17, 1975

[51] Int. Cl.² ............................................. G05B 19/28
[52] U.S. Cl. .................... 318/602; 318/632; 29/26 A; 364/104; 364/118; 364/121
[58] Field of Search ............... 318/600, 601, 602, 603, 318/604; 235/151.11; 29/26 A

[56] References Cited

U.S. PATENT DOCUMENTS

| | | | |
|---|---|---|---|
| 3,353,161 | 11/1967 | Toscano | 318/632 X |
| 3,673,393 | 6/1972 | Schober | 235/151.11 |
| 3,719,977 | 3/1973 | Fantoni | 29/26 A |
| 3,723,842 | 3/1973 | Sather | 318/602 |
| 3,752,969 | 8/1973 | Kiffmeyer et al. | 235/151.11 |
| 3,794,899 | 2/1974 | Breslow | 318/602 |
| 3,795,852 | 3/1974 | Favard | 318/602 |
| 3,917,930 | 11/1975 | Davey et al. | 235/151.11 |

Primary Examiner—Robert K. Schaefer
Assistant Examiner—John J. Feldhaus
Attorney, Agent, or Firm—Leydig, Voit, Osann, Mayer and Holt, Ltd.

[57] ABSTRACT

Methods and apparatus by which a member is moved automatically to any one of a plurality of predetermined positions each of which is precisely established by guiding lock-up means such as a shot pin, and characterized in that inaccuracy of a feedback signal representing actual position of the member is determined prior to each movement toward a different position to create a correction signal used during subsequent repositioning so that the lock-up means will engage when such different position is reached.

11 Claims, 9 Drawing Figures

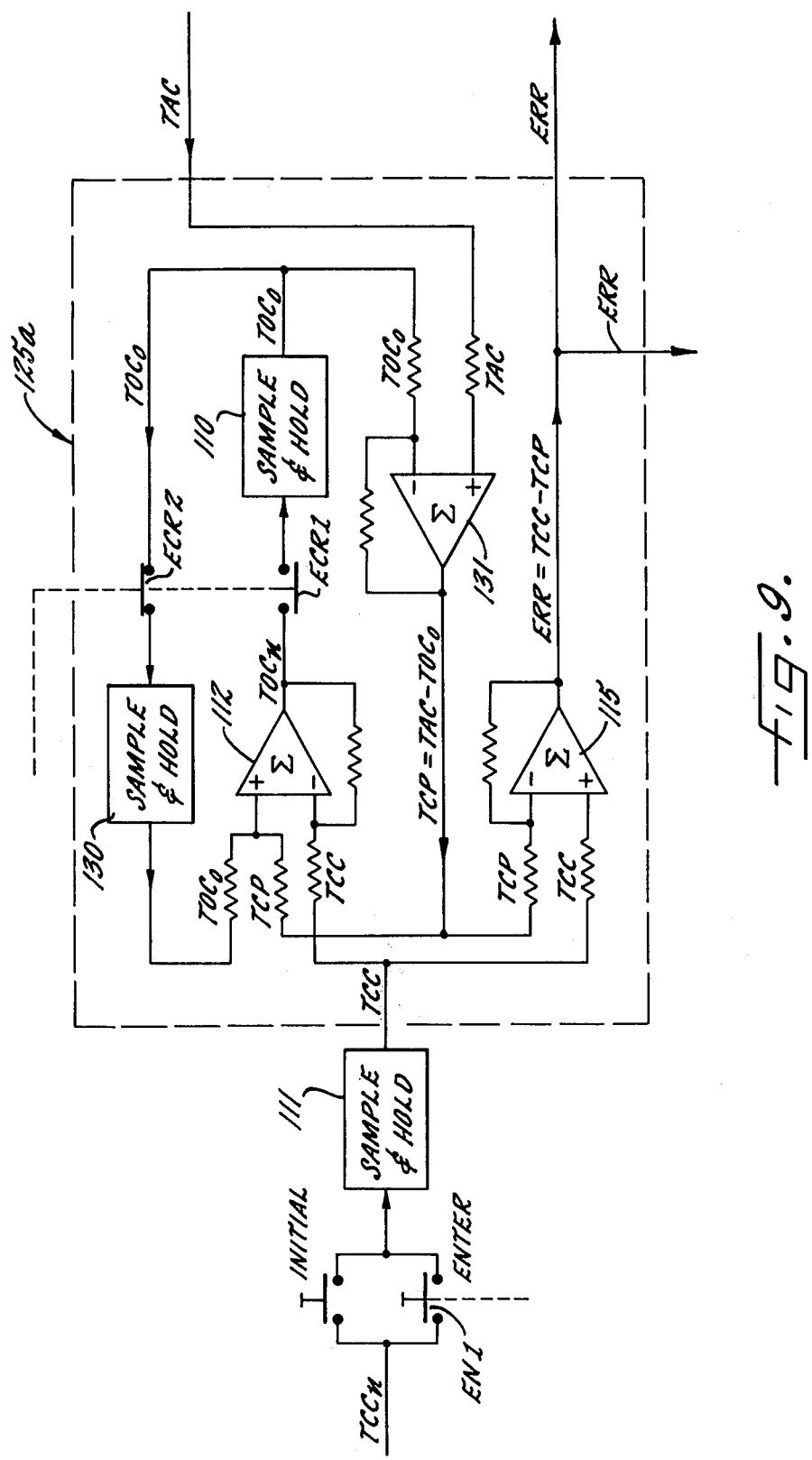

METHODS AND APPARATUS FOR AUTOMATIC MOVEMENT OF A MEMBER TO PRECISELY INDEXED POSITIONS DESPITE SIGNAL DRIFT OR OFFSET

The present invention relates generally to methods and apparatus for automatically moving a member along a path to different, successively commanded positions. It relates more particularly to the automatic positioning of a member at predetermined index positions established by releasable locking means such as shot pins or axially separable, interfitting tooth couplings — and is characterized by the elimination of malfunctions due to drift, inaccuracy or offset in a position feedback signal.

The invention will find advantageous use in controlled positioning of machine tool elements such as turrets, work tables, spindles, or tool storage matrixes — which need to be moved to different predetermined positions at which they are then mechanically locked. But the invention will be applicable in other environments where controlled movement of a member to indexed positions is required.

The general aim of the invention is to provide automatically controlled positioning of a movable member to any of several predetermined index positions at which it precisely locked — and despite offset, drift or inaccuracy in a feedback signal which designates the member's actual position.

A related object is to do away with any need for "phasing" or initial alignment of a position feedback transducer associated with a closed loop positioning system for moving a member to different commanded index positions established by releasable lock-up devices.

Another object is to introduce a correction into the positioning of a movable member to different index positions established by releasable locking means, the correction always being updated prior to movement of the member from one position to another so as to compensate for drifting or inaccuracy in a feedback signal from a position transducer due to aging, temperature changes, wear or similar causes.

These and other objects and advantages will become apparent as the following description proceeds with reference to the accompanying drawings, in which.

Figure 1:
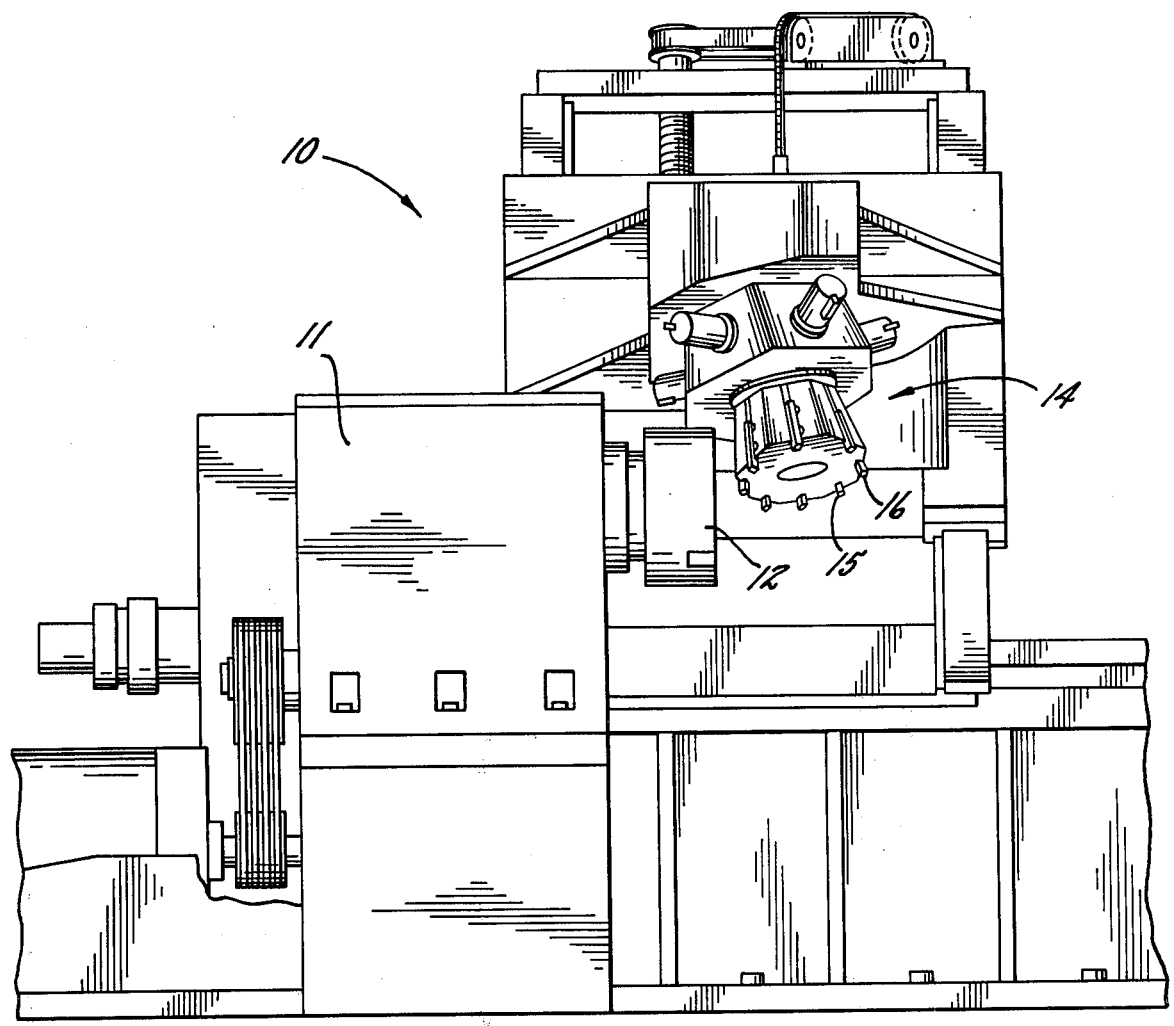
FIG. 1 is a fragmentary elevational view of a turret lathe.
Figure 2:
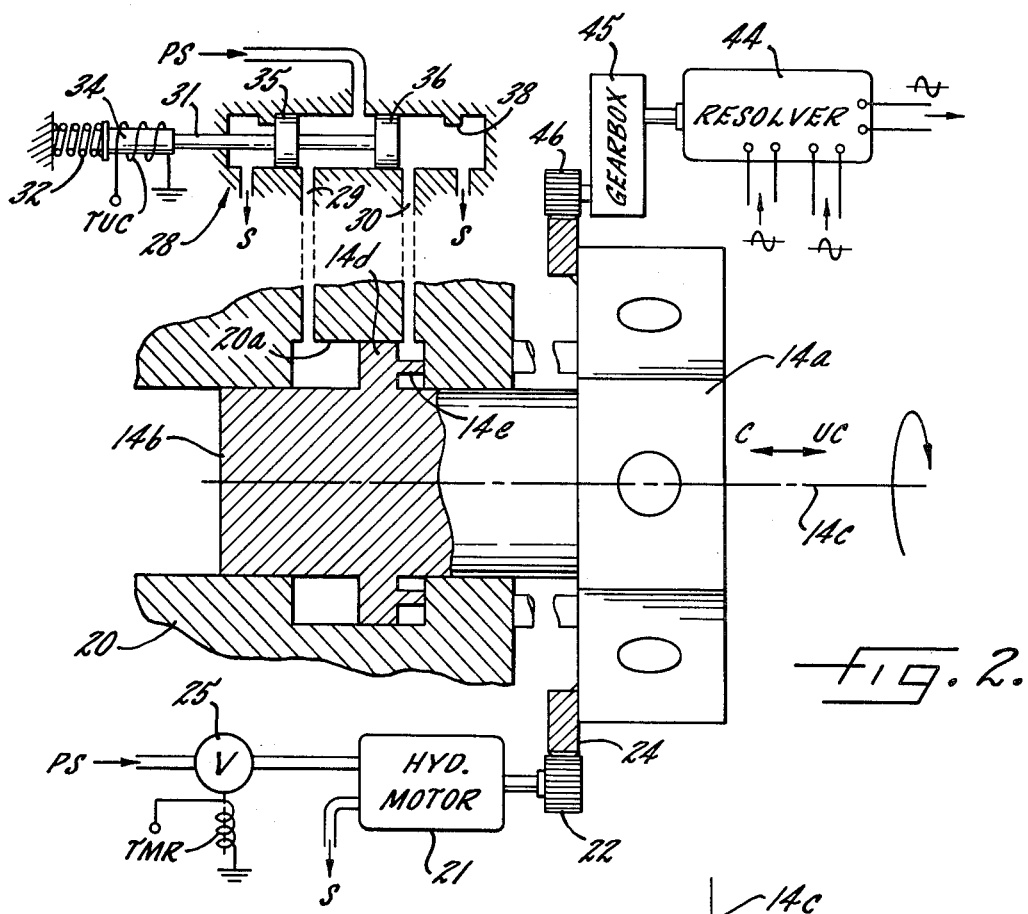
FIG. 2 is a functional, diagrammatic illustration of the indexable turret, showing the arrangement by which it is rotationally moved along a path and is releasably locked or clamped at any one of a plurality of predetermined positions on the path.
Figure 8:
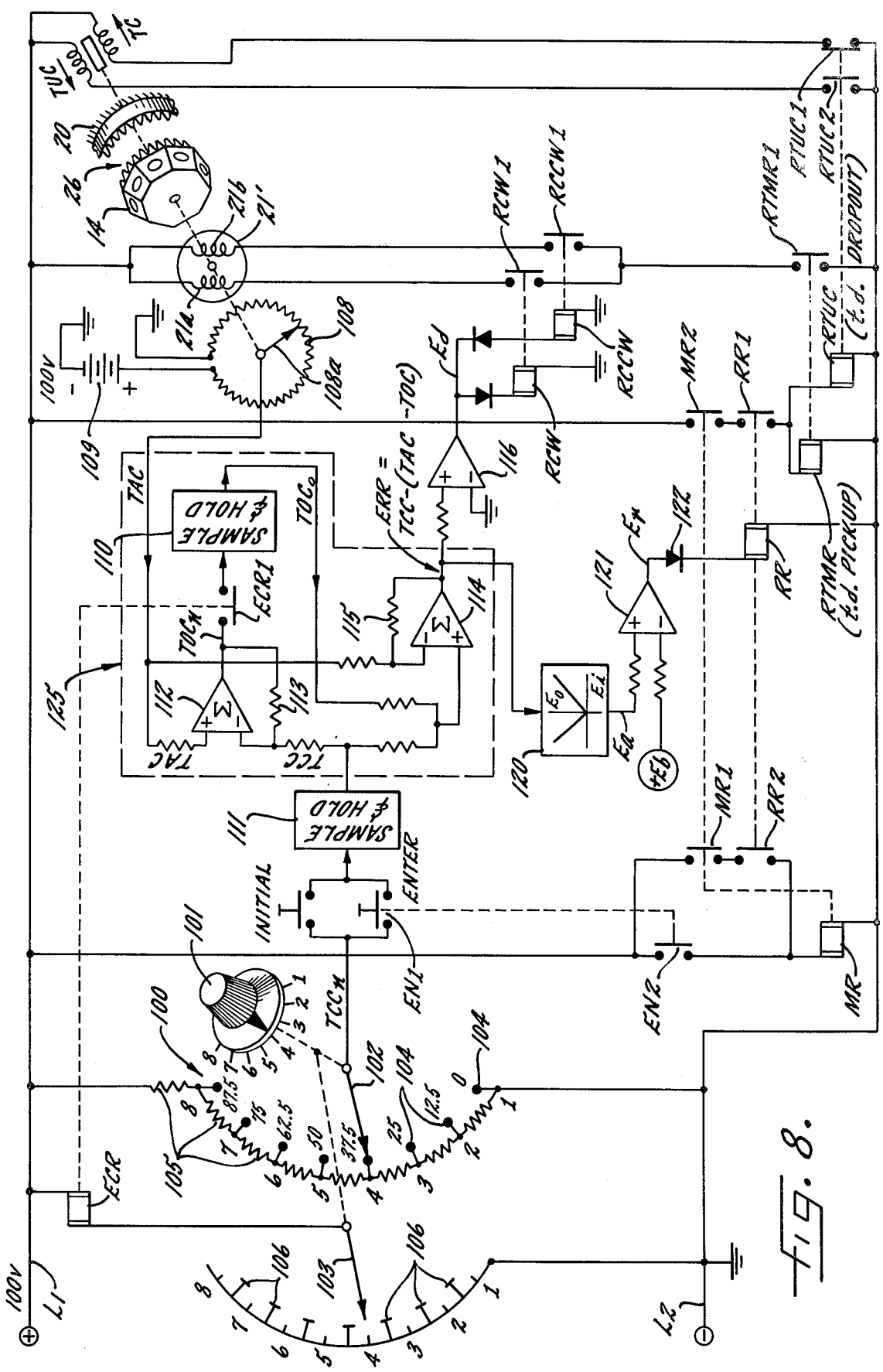

FIG. 8 is a schematic diagram of a control system for the turret of FIGS. 1 and 2, such system being an exemplary, equivalent second embodiment of apparatus which constitutes, and carries out the method of, the present invention; and FIG. 9 is a fragmentary schematic diagram corresponding to a portion of FIG. 8 and illustrating an alternative arrangement of hard-wired analog apparatus for practicing the invention.

While the invention has been shown and will be described in some detail with reference to specific, exemplary and equivalent embodiments, there is no intention that it thus be limited to such detail. On the contrary, it is intended here to cover all modifications, alternatives and equivalents falling within the spirit and scope of the invention as defined by the appended claims.

Merely to make clear the problem solved by the present invention and to set out a typical environment in which the invention is put to advantageous use, FIG. 1 shows a turret lathe 10 having a headstock 11 supporting and driving a work chuck 12, together with a turret 14 having multiple faces adapted to receive and mount a plurality of cutting tools 15, 16. The details of the turret lathe are not important to an understanding of the present invention, but those interested in such details may refer to the copending application of Richard C. Rudolph et al, Ser. No. 501,869, filed Aug. 30, 1974 and assigned to the assignee of the present application. It will suffice to note that the turret lathe is preferably operated by a numerical control system (not shown) which accepts part program information in alphanumeric form on a punched tape or the like, and executes automatically the relative motions between a cutter and the workpiece to form the latter to the desired size and contour. Such numerical control systems are per se well known to those skilled in the art. The turret may be required to be rotationally indexed to different positions about its longitudinal axis at different stages of an overall part program to order to bring different ones of several cutting tools into operative position relative to the workpiece. Generally, when different cutters are required at different stages of a part program, they are so designated or commanded on the punched tape by auxiliary "tool selection" codes, e.g., T01, T02, T03 and so on. The numerical control system responds to each such code by rotating the turret about its axis until the corresponding cutting tool is operatively located relative to the workpiece, after which metal cutting steps of the program are resumed.

Needless to say, the turret when in any of its several (here, eight) possible tool-presenting positions must be rigidly locked, and at a precisely established location on its circular path of movement. Thus, after each turret indexing motion to a newly commanded index position, guiding locking means are actuated to clamp the turret exactly in that commanded position.

As will become apparent, any tool selection code (T01, T02 . . . ) is translated into a commanded position signal for the turret. That signal may have any value within a predetermined range, e.g., a numerical value from 000 to 999 or an analog voltage value from 00.0 to 99.9 volts, designating one of one thousand possible angular positions around a circle. For a member such as the turret 14, however, which is to be located at any one of a relatively small plurality (e.g., eight) of possible index positions, the command signal will be given one of a corresponding limited plurality of values. Assuming for purposes of discussion that the eight turret positions are all equally spaced angularly around a circle, the command signal may be given the respective values 000, 125, 250 . . . 875 corresponding to tool selection codes T01, T02, T03 . . . T08. When the turret is released, i.e., unclamped, for movement, it is driven toward the desired new index position by a position servo system which requires the creation of a feedback signal representing the actual position in which the turret resides in any instant. Ideally, when the actual position signal agrees with the commanded position signal, the commanded position has been reached, and the turret may be stopped and reclamped in that location.

The difficulty encountered in prior systems of this type is two-fold. Firstly, the transducer which senses the position of the turret to create feedback signals may not be "mechanically phased" initially so as to make the feedback signal agree exactly with the theoretical value when the turret is locked at an index position. To adjust the mechanical phasing of the feedback transducer when first installed on a given machine tool or when a system is started up after prolonged shut-down, a considerable inconvenience is involved not only in terms of the operator's time but also in terms of access to a feedback tranducer which may be relatively inaccessible due to its location inside of associated machine tool parts. Secondly, the transducer and its associated amplifier and signal converters may change in characteristics due to aging, temperature variations or wear — so that the feedback signal drifts and becomes inaccurate. For either reason, the feedback signal may be inaccurate, e.g., may have the value of 115 or 135 (or any other value within the possible range here stated by way of example as 000 to 999) when the turret is at its No. 2 station and when the feedback signal should thus theoretically have a value of 125. In such circumstances, commanded movement of the turret to a different index position may result in its being stopped at some erroneous location, or in a position such that the clamping means cannot slide into engagement.

It is to the removal of these difficulties that the present invention is directed.

The diagrammatic illustration of FIG. 2 will provide a better understanding of the environment of the invention here to be described. The turret body per se is formed with a main portion or head 14a having a plurality (e.g., eight) of flat faces apertured to receive tool holder shanks, and an inner cylindrical portion 14b which is supported in the turret slide 20 for both rotational movement about its axis 14c and limited movement along that axis. When the turret is unlocked (as shown), it can be moved (rotated) along a circular path by energization of a suitable driving means, here shown as a hydraulic motor 21. The output shaft of that motor carries a pinion 22 engaged with a ring gear 24 fixed on the inner surface of the turret head; and the motor may be turned on or off by opening or closing a valve 25 leading from a suitable hydraulic pressure source PS. The valve 25 is preferably a solenoid actuated valve which is opened in response to energization of an associated coil TMR, thus causing the hydraulic motor to be energized by pressure fluid flowing from the source PS through the motor and returning to a sump S. It will be apparent that when the motor 21 is thus turned on, the pinion 22 drives the ring gear 24 so as to rotationally move the turret about its longitudinal axis and along the circular path around that axis. Thus, any of the eight faces of the turret body may be brought to a particular angular position, and the turret may be stopped simply by deenergizing the coil TMR to close the valve 25 and stop the motor 21.

As noted above, means are provided to releasably lock or clamp the turret in any one of a plurality of predetermined index positions. As here shown, the inner face of the turret body 14a carries a first mating part 26a, and the opposed face of the turret slide carries a second part 26b, of an axially engageable coupling 26 (the parts 26a and 26b being shown in their axially separated, released positions). The releasable coupling may be viewed as constituted by a pair of axially interfittable crown gears, and is preferably constituted by a coupling of the type marketed in the United States under the trademark CURVEC. The CURVEC coupling may have its two cooperating parts so formed and fixed respectively on the turret body and the turret slide that it will engage when the turret is in any one of 48 different angular positions, but in the present instance only eight of those predetermined positions are effectively utilized. Those skilled in the art will understand that the cooperating parts 26a, 26b of the coupling 26 are formed with curved and tapered teeth which will axially interfit when drawn together so as to guide the turret body rotationally into a particular angular position as the coupling is locked up. Merely as an example for ease of discussion, it will be assumed that the turret body 14a is to be selectively located and locked at any one of eight predetermined index positions spaced equally about a circle (i.e., separated by 45°). If the 360° span of the circle is treated as having 1000 equal parts, the index positions can be numerically designated by the numerical values of 000, 125, 250, 375, 500, 625, 750 and 875 — where the value 000 represents the No. 1 station or home position.

In order to permit engagement or release of the locking device 26 in response to an electrical control signal, the cylindrical portion 14b of the turret body is formed to include a piston axially slidable in what amounts to a hydraulic cylinder, and the application or venting of pressure fluid to or from that cylinder is controlled by a solenoid valve 28. More specifically and as diagrammatically illustrated in FIG. 2, the cylindrical portion 14b of the turret body is formed with a radial flange 14d axially slidable as a piston within a cylindrical cavity 20a shaped in the turret slide 20. With hydraulic pressure supplied to the cylinder 20a through a conduit 29, and with a conduit 30 vented, the turret body is thus urged to the right until spaced projections 14e extending axially from the flange 14d abut the right end of the cylinder 20a. Conversely, if pressure fluid is admitted through the conduit 30 and the other conduit 29 is vented to a sump, the piston 14d and the entire turret body will be urged axially to the left until the mating parts 26a, 26b of the disengageable coupling 26 are firmly pulled together, thereby guiding the turret rotationally to a predetermined position at which it is rotationally locked.

The pressurizing or the venting of the conduits 29 and 30 is controlled by the valve 28 which includes a plunger 31 biased to the right by a compression spring 32 and urged to the left when a coil TUC is excited to apply a force to an associated armature 34. When the coil TUC is energized and the valve plunger is shifted to the left (as shown), a first land 35 on the plunger leaves a path for flow from an hydraulic fluid pressure source PS through the valve body to the conduit 29; and a second land 36 establishes communication from the conduit 30 through the valve body to a sump S. Conversely, when the coil TUC is deenergized and the spring 32 urges the plunger 31 toward the right until the land 36 abuts a stop 38, then an hydraulic fluid flow path is established through the valve 28 from the pressure source PS to the conduit 30, and a return flow path is established from the conduit 29 to the sump S. In summary, when the solenoid TUC associated with the valve 28 is energized or deenergized, the turret body is shifted axially to the right or the left so as to release or engage the locking device formed by the coacting parts 26a, 26b of the coupling 26.

Figure 3:
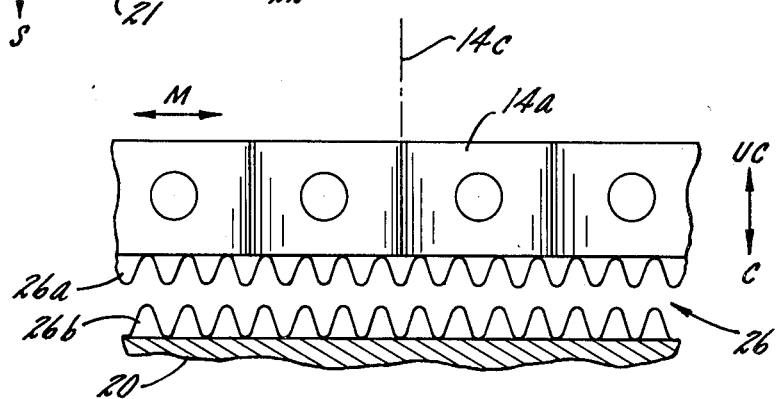
FIG. 3 is a developed view of the generally cylindrical turret body, showing in diagrammatic form the releasable locking means.

The developed view in FIG. 3 illustrates the functional principle of the CURVEC type releasable locking device 26. The two cooperating parts 26a, 26b in effect have tapered teeth which are axially separated when the turret is unclamped, thereby permitting rotational movement. But as the turret head 14a is drawn axially toward the slide 20, the tapered teeth begin to fit together, and they will rotationally shift the turret bodily, if necessary, to guide it to a precisely known locked position when the teeth of part 26a are pulled fully into the mating valleys of the opposite part 26b. As a specific example, the cooperating teeth may be sized with a pitch of about 2.4°, and the two parts will pull into full engagement if the turret is first angularly located within ±1.08° of the desired final position.

Figure 4:
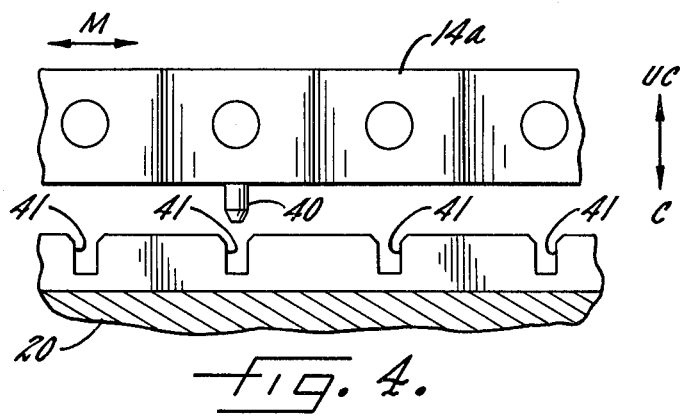
FIG. 4 is similar to FIG. 3 but illustrates diagrammatically an alternative locking apparatus.

The releasable, guiding locking device 26 is merely representative of a wide variety of alternatives known to those skilled in the art. As a second example, FIG. 4 shows the inner face of the turret head 14a carrying a slightly tapered rigid shot pin 40 which can be moved axially into or out of any of a plurality of cooperating holes 41 formed with tapered mouths in the opposed face of the slide 20. After the turret has rotated to within a given proximity or range of a predetermined position defined by one of the holes 41, then axial shifting of the turret body will move the pin 40 with guiding action into the hole, thereby locking or clamping the turret exactly in that predetermined and known position.

In a general sense, the turret body 14a, 14b may be viewed as representative of a member movable along a path to any one of a plurality of predetermined index positions (which need not be equally spaced apart) and which is associated with a releasable locking device for establishing and holding the member precisely at any of such known positions. The hydraulic motor 21 (FIG. 2) serves as a selectively energizable means for driving the turret along its path (here, a circular path) from any one index positon to any other desired index position when the locking device is disengaged. There are, of course, many applications or machines where selective movement of a part to any one of several precisely known index positions is required. For example, the work table of a vertical turret lathe may similarly need to be locked up by shot pins or the like in various known positions. Thus, term "member" as applied to the turret body 14a, 14b is intended in the broadest sense to denote any member movable selectively along any defined path (circular, linear or otherwise) to different ones of predetermined and known index positions.

In controlled movement of the turret 14 to its various index positions, it is necessary that some means be provided for creating a feedback signal which by its value represents the actual turret position and which changes in accordance with changes in the turret position. Any of a variety of position feedback transducers may be employed. The exemplary arrangement of FIG. 2 includes a phaseshifting resolver 44 coupled to sense the turret's actual position. The resolver is a rotary induction device well known in the art, and it is here shown as having its rotor coupled via a reducing gear box 45 and a pinion 46 to the ring gear 24. The arrangement is such that the resolver rotor makes one revolution for each revolution of the turret. As explained below, the resolver is excited with reference and quadrature ac. voltages, and the output signal induced in the rotor winding shifts in phase through 360° relative to the reference as the turret rotates 360°. It may thus be said that the resolver 44 is an exemplary transducer which produces a feedback signal whose phase changes with and represents the actual turret position.

With the foregoing as background, the present invention will be described with reference to exemplary, equivalent "digital" and "analog" embodiments. Both such embodiments are effective to carry out the method of the invention.

Figure 5:
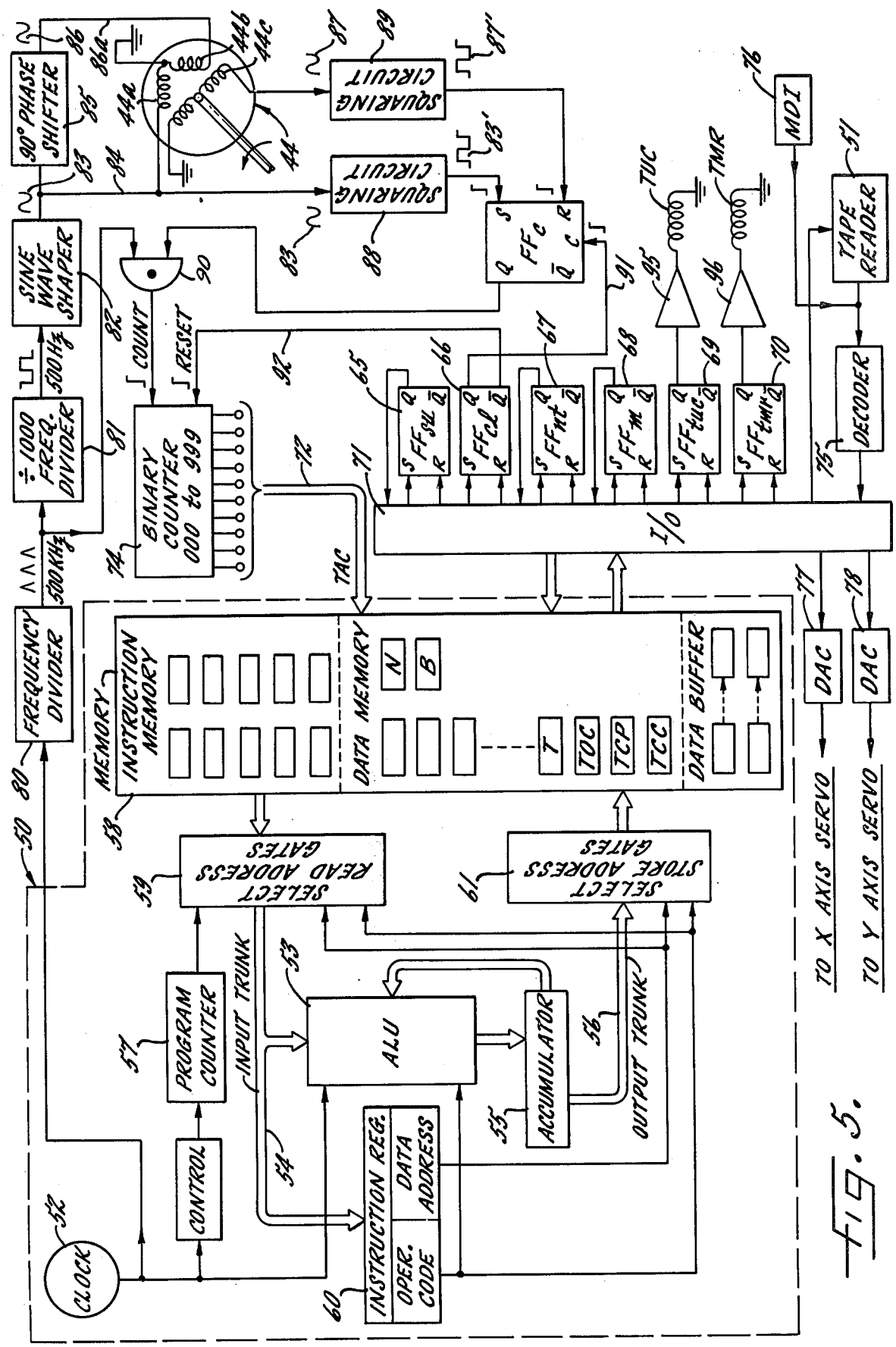
FIG. 5 is a diagrammatic illustration in schematic block-and-line form of a control system for the turret of FIGS. 1 and 2, such system being an exemplary, preferred embodiment of apparatus which constitutes, and which carries out the method of, the present invention.

Turning now to FIG. 5, the digital embodiment there shown is formed as a portion of a numerical control system associated with the turret lathe 10, but the principle parts of that system which are not necessary or relevant to an understanding of the present invention are omitted from the drawing. Generally stated, and as known in the art, the numerical control system includes a programmed digital computer 50 which receives part program "blocks" of alpha-numeric signals from a punched tape reader 51 and operates on a rapidly repeating computational cycle to supply changing position commands via digital-to-analog converters to the servos which move the machine tool elements along X, Y and Z axes — thereby moving the effective cutting tool relative to the workpiece in order to shape the latter to a desired size and contour. When the turret is to be indexed at various points in the operations on the workpiece in order to make a different cutting tool effective, the system receives a tool selection code signal from the taper reader. It is this latter aspect of the system which is relevant to and embodies the features of the present invention.

The computer 50 may take any of a variety of forms commercially available and known to those skilled in the art. Specifically, the computer actually used in a commerical product application of the invention is a Hewlett-Packard Model 2100, but other types and brands would be satisfactory. By way of background introduction, and as is well known, the computer includes a clock 52 which supplies timing signals to the other computer components so that elementary steps of fetching signals from memory, performing arithmetic operations, and storing the results are carried out in rapid sequence according to a stored program of instructions. For this purpose the computer includes a main arithmetic-logic unit (ALU) 53 served by an input trunk 54. An accumulator 55 receives the output from the ALU and transmits it over an output trunk 56. The output from the accumulator is sent back as an operand input to the ALU in certain arithmetic or comparing steps. These trunks are multiconductor wires which carry multi-bit signals representing in binary or BCD format numerical values of variables which change as a result of inputs from the tape reader 51 or computations performed by the ALU 53.

The computer includes signal storage registers within a "memory" 58 which functionally is divided into sections containing instruction words, active data words, and buffer data words. In simple terms, when the computer finishes execution of one "block" of active data previously read in from the tape reader 51, it transforms and transfers the next succeeding block from the buffer to active data section, and causes the tape reader 51 to start up and read the following block into buffer storage where it will be ready for subsequent use. The memory registers in the instructions section are set by reading in and storage of a "master program" to contain multibit words of instruction which designate the operations to be performed in sequence, with logic branching and interrupts. The instruction memory contains the master program and sets up the gates and controls of the general purpose minimcomputer to convert it into a special purpose digital control apparatus, the pertinent portion of that program being described hereinafter.

Since the organization and operation of the digital computer is well known, it will suffice to observe briefly that advancement of the program counter 57 to an address number will cause selecting gates 59 to read the addressed memory instruction onto the input truck and into an instruction register 60. The decoded output of the latter controls the ALU as regards the operation to be next performed (e.g., add, subtract, complement, compare, etc.). That output also controls the address selecting gates 59 to fetch from the data word next to be used as an operand, the multi-bit signals being sent via the trunk 54 to the input of the ALU. At the conclusion of an arithmetic or logic sequence, the result or answer appears in the accumulator 55 and is routed via the trunk 56 through storage address gates 61 to an appropriate location or register in the memory. The gates 61 are controlled by the output of the instruction register, so that an answer is sent to the proper memory location, replacing any numeric signals previously there stored.

In a fashion familiar to those skilled in the art, the individual registers or memory locations may be designated by acronyms, and the quantity represented by the changeable number in any register may be designated by the same acronym. Each storage register or memory location thus constitutes a means for producing signals of various types and which can be changed in value by programmed computations effected by the ALU under control of the stored master program.

In addition to multi-bit words of memory, the computer 50 may treat individual bits as single bit numbers having values of 0 or 1. This may be done to sense whether bi-state devices are on or off, and to set bi-state devices to their on or off condition. As here shown, there are provided, outside of but in conjunction with the computer, a plurality of flip-flops 65–70 coupled to the data memory through an input/output interface 70. As is well known, the flip-flops can be set or reset by outputs fed from the output trunk 56 and gates 61 when certain conditions defined in the program obtain. Moreover, the states of such flip-flops may be read into the ALU via the gates 59 and the input trunk 54 when an instruction calls for sensing or fetching any one-bit word signaled by a particular flip-flop.

Finally, there is provided a multi-bit signal line 72 leading into the computer from a binary counter 74, the function of the latter being explained below. For the present, it will be noted that the multi-bit signals at the outputs of the counter 74 represent a variable feedback signal TAC, representing any numerical value between 000 to 999. From the trunk 72, the number TAC may be selected by the address gates 59 for entry into the ALU, just as if it were being fetched from a memory storage register.

Merely for the sake of completeness, FIG. 5 also indicates that the tape reader 51 is coupled through a decoder 75 and the input/output interface 71 to the computer memory, so that successive alpha-numeric signals may be passed through the select address gates 59 and input trunk 54, and then routed from the accumulator into the appropriate buffer memory locations. The tape reader is started by a signal from the computer when a fresh block of data is needed in buffer storage, and is stopped when the buffer is full. Also, alpha-numeric data or information may be similarly entered into the computer from the keyboard of a manual data input (MDI) unit 76.

In the active execution of a block of data, position command signals are rapidly updated to designate the directions, distances and velocities at which the cutter is to be moved along X and Y axes. Although this in no way pertains to the subject matter of the invention here claimed, the changing digital signal designating X and Y axes positions are transmitted through the input/output interface 71 to digital-to-analog converters 77, 78 to the X and Y axis servos (not shown) of the machine tool. It is understood, of course, that the computer 50 runs through successive iterations of its entire master program, including branches and interrupts as they may arise, with such rapidity that the effect is essentially the same as if the various input signals were continuously sensed and the various output signals were being continuously changed.

As mentioned above, the controlled positioning of the member or turret 14 involves the creation of a feedback signal which represents the actual position. The output from the resolver 44 (FIG. 2) is a phase-analog feedback signal, whereas a numerical control system involving an iteratively operating digital computer requires a feedback signal which is digital and numerical in nature. For this reason the phase-variable output of the resolver 44 is, in the arrangement of FIG. 5, "digitized", i.e., converted to a digital signal which can represent any number between 000 and 999 as the turret moves through one thousand positions around its circular path.

As shown in FIG. 5, the clock 52 within the computer 50 may be assumed to have a frequency of 2 MHz., for example, and the clock pulses are frequency divided as necessary within the computer to provide the various required timing signals. In order to convert the phase analog output signal of the resolver 44 into digital, numerical form, the recurring pulses from the computer clock 52 are passed through an appropriate frequency divider 80 to produce pulses having a frequency of 500 KHz. These latter pulses are fed to a second frequency divider 81 which produces a squarewave having a frequency of 500 Hz. This squarewave signal is routed through a sine wave shaper and filter 82 so that an essentially pure sine wave with a frequency of 500 Hz. is created as a reference ac. signal 83 appearing on a conductor 84. The reference signal 83 is also passed through a 90° phase shifter 85 to create a quadrature reference ac. voltage 86 on a conductor 86a. As shown, the reference and the quadrature reference voltages 83 and 86 are applied to the stator windings 44a and 44b of the resolver 44 so as to induce an output voltage 87 in the rotor winding 44c. As is well known, the phase of the output voltage 87 from the rotor winding 44c varies relative to the reference ac. wave 83 according to the angular position of the resolver rotor; and thus it may be said that as the turret 14 rotates from a given starting position through one full revolution, the resolver output signal 87 shifts in phase through 360° relative to the reference voltage 83.

In order to convert the phase variable signal 87 into a digital, numerical signal, the reference wave 83 and the resolver output signal 87 are passed through respective squaring circuits 88 and 89 to supply correspondingly relatively phased wave voltages 83' and 87' to the set and reset input terminals of a control flip-flop $FF_c$. Thus, when the reference squarewave 83' undergoes a positive-going transition, the flip-flop $FF_c$ will be set; and when the output wave 87' similarly passes through a positive-going transition the flip-flop $FF_c$ will be reset. The repeating time intervals during which the flip-flop $FF_c$ resides in its set state will thus vary directly in proportion to the phase angle by which the resolver output signal 87' lags the reference voltage 83'. Those time intervals are a direct measure of the phase angle between the reference signal and the resolver output wave.

In order to create a digital representation of the resolver output phase angle, and thus of the turret's rotational position, the Q output terminal (which resides at a high or "1" level when the flip-flop is set) of flip-flop $FF_c$ is connected to one input of an AND gate 90 which receives as its other input the 500 KHz. pulse train appearing at the output of frequency divider 80. The output of the AND gate 90 is connected to the input of the binary counter 74. Thus, if one assumes that the counter 74 has been initially reset to zero, the counter will count pulses received from the frequency divider 80 (and having a frequency of 500 KHz.) for a time interval which is proportional to the angular displacement of the turret from a "home" position along its 360° circular path. As an example to illustrate the translation of the turret's actual position into corresponding numerical signals, let it be assumed that the turret is displaced by 90° from its home or zero reference position (assumed to be station No. 1). In that circumstance, the output signal 87' from the resolver 44 will lag the reference wave 83' by 90°, and thus the flip-flop $FF_c$ will be turned on or set for a time interval corresponding to one-quarter cycle of the 500 Hz. reference wave. Since the period for a 500 Hz. signal is 0.002 seconds, and the flip-flop $FF_c$ is turned on for one-quarter cycle, the Q terminal of the flip-flop will reside at the "1" level and enable the gate 90 for a time interval of 0.5 milliseconds. If pulses from the divider 50 at the 500 KHz. frequency are accepted and counted in the counter 74 for a period of $5 \times 10^{-4}$ seconds, the counter will reach and hold a count of 250 at the instant the flip-flop $FF_c$ resets to disable the gate 90.

In similar fashion one may see immediately that whenever the counter is reset to zero and then enabled for counting by the flip-flop $FF_c$ and the gate 90, the ending count for the counter (signaled as the number TAC) will represent the actual angular position of the turret on a scale where one thousand counts corresponds to 360°. In other words, for each unit of the number signaled by the counter (after it has been enabled for counting) the turret is displaced by 0.36° from a home or reference position. The output number signaled by the counter 74 will for all intents and purposes, and as hereinafter made clear, represent the actual position of the turret, having any value between 000 and 999. This output signal is transmitted via the trunk 72 to the memory section of the computer 50 where it is, for convenience of description, designated as a signaled variable number TAC. The manner in which the actual position signal TAC is utilized will become apparent hereinafter.

It is to be noted that the flip-flop $FF_c$ will be cleared (i.e., switched to or left in its reset state) by a control voltage sent via a conductor 91 to a clearing terminal c. Also, the counter 74 may be reset by a signal applied via a conductor 92 to its "reset" terminal, thereby restoring the counter to its 000 count state. The clearing and resetting signals are created when the computer respectively sets and resets the flip-flop 66, in a manner to be described below. One may understand at this point that the counter may be selectively put through a counting cycle so as to signal the actual position of the turret at its output each time the control flip-flop is cleared. This is done by setting the flip-flop 66 to create a positive-going transition on the line 91 which resets the flip-flop $FF_c$ (or leaves it in the reset state), after which the flip-flop 66 is cleared or reset to create a positive-going voltage transition on the line 92 which restores the counter 74 to its zero count state. The computer 50 controls the flip-flop 66 to clear both the flip-flop $FF_c$ and the counter 74 before the actual position signal TAC is utilized, thereby making certain that the feedback signal value is freshly determined and up-to-date.

Those particular "words of memory" or storage registers within the computer 50, and which serve as a means for producing signals representing changeable values utilized in the practice of the invention, are labeled by arbitrary acronyms in FIG. 5. For brevity, these memory locations or storage registers, and the signals which they provide, may be identified in the following tabulations:

T: The storage register and the signals T contains and designate the tool selection code number denoting the desired position at which the turret is to be located. For a turret having eight positive index positions, this number may be 01, 02, 03, 04, 05, 06, 07 or 08.

TCC: The storage register and the signals TCC designate the desired turret commanded count, i.e., the number which in value represents the commanded turret position within the range of the turret's path of movement. If the turret path of travel is divided into one thousand equal parts, for example, this number may have any value between 000 and 999, but for the specific case of a turret movable to any of eight equally spaced angular positions, it will have a value of 000, 125, 250, 375, 500, 625, 750 or 875.

TOC: The storage register and the signals TOC designate the turret offset correction value utilized to compensate for drift and inaccuracy, as hereinafter described.

TCP: The storage register and the signals TCP designate the turret's corrected position, based upon the feedback signal TAC and the correction TOC.

N: The storage register and the signals N designate a constant, which may be changed in the control of different movable members, representing the number of equally spaced index positions at which the particular member being controlled may be located.

B: The storage register and signals B designate a constant which represents, on the numerical scale of the turret path, the bandwidth or range within which the turret must approach a final index position in order for the releasable coupling to engage finally at that position when the coupling is actuated.

TAC: The signal TAC designates (as noted above) the actual count in the counter 74 and which represents numerically the actual position of the turret, such signaled value being subject to drift and inaccuracy as described below.

$FF_{su}$: The symbol $FF_{su}$ designates the flip-flop 65 and the one-bit signal it produces; the flip-flop is set when the system is started up, and is reset after preliminary signal processing.

$FF_{cl}$: The symbol $FF_{cl}$ denotes the flip-flop 65 controlled by the computer for clearing the flip-flop $FF_c$ and resetting the counter 74.

$FF_{nt}$: The symbol $FF_{nt}$ designates the flip-flop 67 and the one-bit output signal which it produces; when that signal is a "1" it signifies that a "new T code" has been received in the active memory location T.

$FF_m$: The symbol $FF_m$ designates the flip-flop 68 and the one-bit signal which it produces; when the flip-flop is in its set state and the signal is at a "1" level, "movement" of the turret has been initiated and is in progress.

$FF_{tuc}$: The symbol $FF_{tuc}$ designates the flip-flop 69 and the one-bit signal which it produces; the turret is unclamped when and so long as that flip-flop is in its "1" state.

$FF_{tmr}$: The symbol $FF_{tmr}$ designates the flip-flop 70 and the one-bit signal which it produces; the turret motor 21 is turned on and running when and so long as that flip-flop is in its set state.

The flip-flops 69 and 70 when in their set states supply level "1" logic signals respectively to driver amplifiers 95 and 96 which in turn energize the solenoids TUC and TMR associated with the values 28 and 25 shown in FIG. 2. When the first flip-flop $FF_{tuc}$ is set, the turret is unclamped; and when the second flip-flop $FF_{tmr}$ is set, the turret motor is turned on and runs to rotate the turret.

It should be noted that the turret position feedback signal TAC is subject to drift or inaccuracy. A first source of this difficulty arises from the fact that when the resolver 44 is mounted as depicted in FIG. 2, its stator may not be fixed in an angular position such that the output signal phase angle is zero whenever the turret is in its home or zero position. This "offset" can be removed by rotationally adjusting the resolver stator for a zero phase output signal when the turret is in its home position, and then relocking the turret stator. But such adjustment is time-consuming and inconvenient especially if the resolver is disposed inside of the turret assembly or otherwise at an inaccessible location. Secondly, the resolver itself may be temperature sensitive. As it heats up in the course of a day's operation, its output signal phase may drift or become offset relative to the actual position of the turret. Thus, at any particular time during operation of the machine tool and the control system, one cannot be confident that the resolver output signal phase and the resulting digital signal TAC truly represent the actual position at which the turret resides. Also, the sine wave shaper 82 and the phase shifter 85 (as well as the amplifiers, not shown, associated therewith in actual practice) may change characteristics with aging, temperature or power supply variations — thereby inducing drift and inaccuracy in the theoretically perfect relation between the turret position and the value of the feedback signal TAC. If the latter signal drifts or is offset to a value of 110 when the turret is at its No. 2 index position (when the actual position signal should be 125), then if the turret is moved from some location toward a commanded position of 125 until the difference between the commanded and actual position signals become equal, the turret will stop at an actual position of 140. Such a large error may result in the turret being locked up (if the teeth of the coupling 26 are relatively fine) in the wrong location, and a small error of this nature may result in the teeth of the coupling parts abutting in direct tip-to-tip relationship so that they fail to pull into full engagement.

In carrying out the invention, the digital computer 50 is conditioned by a program to constitute a plurality of means for performing certain functions and to carry out the method steps which are involved. The computer is not the only apparatus involved, however, since the means for producing the actual feedback signal TAC are outside the computer, and the means for releasably locking as well as the means for selectively moving the turret are also outside of the computer. With this in mind, a detailed understanding of the invention may best be gained from a narrative sequence of the operations which occur, such sequence being set out below with reference to the flow chart of FIG. 6 and the program listing Table I, the latter table being located for convenient reference in the last few pages of this specification.

In this first embodiment of the invention, there are two start-up procedures which the machine operator should follow. First, when the system is to be turned on and put into use, the turret 14 is assumed then to reside in one of its index positions. If this is not true, the operator should manually locate the turret at one of the index positions. Observing the index location of the turret, the operator then enters into the TCC memory register a command number value which designates the position at which the turret is actually and precisely located. This is easily done by addressing an entry through the MDI unit 76. If the turret is residing at station No. 3, for example, the command number 250 will be manually entered into the TCC register. Secondly, the start-up flip-flop $FF_{su}$ is set by an MDI entry of the machine operator, so that the system will know that the first cycle through the turret control sub-routine is a "start-up cycle".

Thereafter, the numerical control system may be put into operation in a conventional fashion. While the computer is cycling through its main numerical control program, and the system is controlling the relative movements of the cutter and the workpiece, the timing circuits within the computer generate an interrupt pulse every thirty-two milliseconds so as to cause branching into the sub-routine program shown in flow chart form by FIG. 6 and listed in Table I. The instructions for the sub-routine have been previously set into the computer's instruction memory in a manner familiar to those skilled in the art. The descriptive sequence which follows will make clear the successive operations which are carried out by the apparatus already described, including the computer which has been set up according to the sub-routine program.

Assuming that an interrupt pulse has been produced by the computer timing circuits (and one such pulse appears every thirty-two milliseconds) the sub-routine program begins with steps 001 and 002 during which the flip-flop $FF_{cl}$ is respectively set and then reset. From FIG. 5, it may be seen that this clears the control flip-flop $FF_c$ (assuring that the latter is switched to or left in its reset state) and then clears the counter 74 (setting the latter to zero count contents). When the next positive wavefront in the squared reference wave 83' appears, the flip-flop $FF_c$ is set, the gate 90 is opened and pulses from the divider 80 are counted. When the phasevariable squared resolver output 87' thereafter has a positive-going transition, the flip-flop $FF_c$ is reset and the gate 90 is closed. In the intervening interval (which depends upon the phase of the resolver output 87 relative to the reference voltage 83), the counter 74 reaches a count state which it digitally signals as the number TAC and which in value represents the actual position of the turret 14. As an example, if the turret resides in a position displaced by 180° from its home or reference position (assumed to be station No. 1), the counter should receive five hundred pulses from the frequency divider 80, and the signaled number TAC should have a value of 500. As noted, however, the actual position feedback signal TAC may be inaccurate due to offset or drift. The signal TAC may turn out to have an erroneous value of 490 or 580 or 203 or 713. Nevertheless, this "updating" of the number TAC occurs every thirty-two milliseconds and during the early steps 001 through 003 of the sub-routine illustrated by FIG. 6 and Table I. Even if the turret is moving at a speed of, say, 4 r.p.m., the updating of the feedback signal TAC is so rapidly repeated that it dynamically reflects the changing turret position.

At the following sub-routine program step 003, the computer 50 is caused to wait or delay for four milliseconds. The internal computer components used for creating this delay have not been illustrated because such components and their operation are very well known in the art. The delay is created by counting timing pulses in a register until a predetermined total is reached, indicating that four milliseconds have elapsed. Then the computer proceeds to the next program step 004. The four milliseconds delay assures that after step 002 and the resetting of the counter 74 there is sufficient time for the number TAC to be formed in the counter. Since the flip-flop $FF_c$ might be cleared just prior to a positive-going transition in the reference wave, — and assuming, for example, that the reference wave and resolver output have a frequency of 500 Hz. — a full cycle (i.e., two milliseconds) of the reference wave may be required before the flip-flop $FF_c$ is set to start the counter 74. Similarly that counting might be initiated just after the resolver output signal has gone through a positive transition, so that almost a full cycle (i.e., two milliseconds) of the resolver output wave may be required before the flip-flop $FF_c$ is reset. In this case, the resolver output signal would be displaced almost 360° in phase from the reference wave and the counter would end up with a final number of 999. But the four millisecond delay here described assures that under any circumstances there will be sufficient time for the number TAC to be formed in and signaled by the counter 74.

If the entire control system has just been started into operation (as described above) it is necessary initially to establish a value for the correction number TOC. Accordingly, at steps 004 and 005 in the program, the signal from the flip-flop $FF_{su}$ is brought into the cleared accumulator. If that signal is a zero indicating that start-up has previously occurred, the program causes the computer to skip to step 011. But if that signal is a one indicating that the current cycle is the initial cycle through the sub-routine program, then the computer proceeds to program step 006.

When the latter step is entered, an initial value for the offset correction number TOC is computed and stored. This involves the individual steps 006 through 009 shown in Table I wherein (a) the accumulator is first cleared or set to zero, (b) the number TAC is read additively into the ALU and added to the existing number zero in the accumulator to make the new sum appearing in the accumulator equal to the signaled number TAC; (c) the number TCC is next read into the ALU from storage with a subtraction operation code so that the difference TAC − TCC appears in the accumulator; and (d) thereafter the resulting number TOC is routed from the accumulator via the output trunk to storage in the register TOC. By this step-by-step procedure, the computer performs the arithmetic operation:

$$TOC = TAC - TCC \tag{1}$$

Because TCC in the foregoing equation precisely represents the actual position of the turret locked up in one of its known index locations, the number TOC so stored represents the discrepancy or offset which then exists in the feedback signal TAC.

Thereafter, in the execution of this initial cycle through the sub-routine, the computer on step 010 sends a signal to clear the flip-flop $FF_{su}$ and the program control causes skipping to step 043, whereupon the sub-routine is completed and the computer exits back to its main numerical control program. It will be understood that program steps 006 through 010 are performed only during the initial cycle and during all subsequent cycles the system proceeds from step 003 to step 011 because the flip-flop $FF_{su}$ has been cleared or reset at step 010 when the initial cycle was executed.

Figure 6:
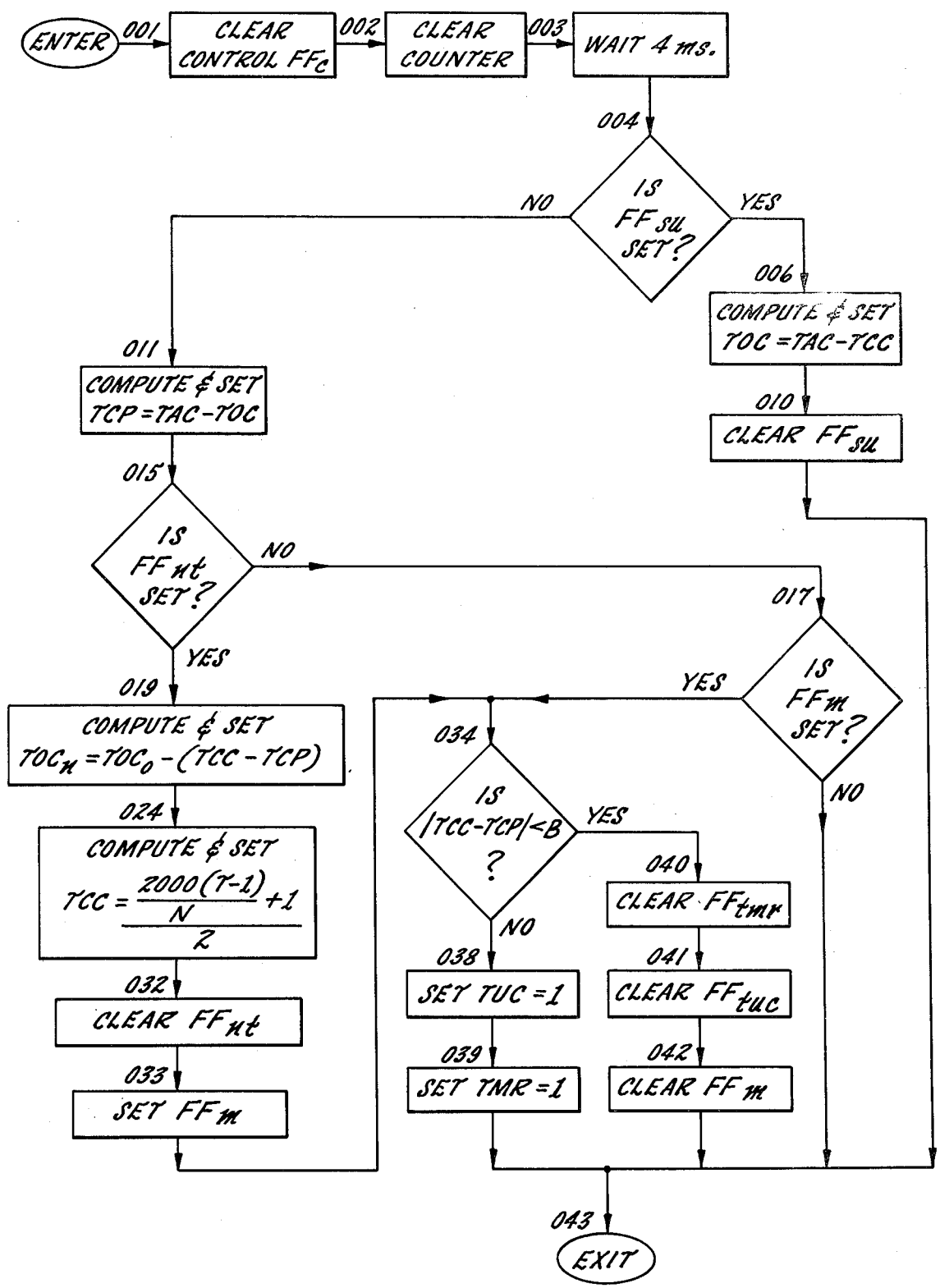
FIG. 6 is a flow chart depicting a master program which sets up and organizes the digital computer in the system of FIG. 5.

In a regular and repeating cycle (other than the initial cycle) steps 011 through 015 are utilized to compute and signal numerically a corrected feedback position number. As indicated by FIG. 6 and Table I, the number TCP is computed and stored according to the relation:

$$TCP = TAC - TOC \tag{2}$$

The stored number TCP thus represents an accurate actual position signal for the turret, i.e., the value which the feedback signal TAC would have if it were unaffected by offset or drift. For example, assume that when the turret is locked at its No. 2 station its known actual position is numerically 125. But if the number TAC then has the erroneous value of 120 because of drift or offset, then the correction number TOC will be equal to TAC − TCC or 120 − 125 = −5 — as will result from Equation (1), supra. Then, when the computation and storage of the number TCP occurs according to Equation (2) during program steps 011 through 015, the signaled number TCP becomes equal to TAC − TOC and in this example becomes 120 − (−5) = 125. Thus, in keeping with the present invention as carried out by the exemplary embodiment of FIGS. 5 and 6, error or offset in the feedback signal TAC is corrected by forming a new and accurate feedback position signal TCP after subtracting from the feedback TAC the determined offset value TOC. Noteworthy is the fact that the offset or correction value TOC can always be determined by comparing the feedback signal TAC with the commanded signal TCC when the turret is locked up at an index position because the turret when so locked up is known to be precisely in a particular one of its several possible index positions which is represented by the number TCC.

After the corrected actual position feedback number TCP has been updated and stored, the system proceeds to program steps 015 and 016 where the signal bit output signal from the flip-flop $FF_{nt}$ is read into the cleared accumulator. The objective here is to determine whether or not a new and different command for another index position has been received. If the flip-flop $FF_{nt}$ is in its "1" state, then the turret has been commanded by a new value of the T number to move to another index position. On the other hand, if the flip-flop $FF_{nt}$ is in its reset state, then no command for changing the turret position has been received subsequent to the preceding cycle through the sub-routine. It will be assumed that in the present iteration of the program a new T code has just been received in data memory to change the T number from one value to another, and thus that the flip-flop $FF_{nt}$ has been set to its "1" state. In these circumstances, the accumulator signals a binary "1" after the $FF_{nt}$ bit has been read in during step 016, and the system therefore skips from step 016 to step 019.

In accordance with the invention, at some point in time prior to movement of the controlled member from one index position to another in response to a changed position command, and preferably just prior to initiation of such movement, the discrepancy or inaccuracy present in the feedback signal TAC is determined in magnitude so that it may be utilized for corrective purposes. As reflected in FIGS. 5, 6 and Table I, this updating correction is performed by the programmed computer 50 during program steps 019 through 023. As seen from Table I and FIG. 6, the accumulator is first cleared, the existing value of the offset correction number TOC is read into the ALU and the accumulator, and then the present command number TCC and the present corrected position feedback signal TCP are combined respectively in subtractive and additive senses. Thus, the offset correction number is updated and changed to a new, precise value according to the equation:

$$TOC_n = TOC_o - (TCC - TCP) \quad (3)$$

To illustrate concretely by way of exemplary numbers, it may be assumed that when the offset number TOC was computed and stored at an earlier point in time (i.e., when the turret was moved to its presently existing index position a few minutes or a few hours earlier), the offset number value for TOC was −5 because the difference between the feedback signal TAC and the true position of the turret at that time was −5. If the resolver or its associated circuits have in the intervening interval further drifted so that the difference between the feedback signal TAC and the true present index position of the turret is −10, a different value of the offset correction TOC is required. This is found and determined by performing the computations described for program steps 019 through 023. Assuming that the turret is residing at station No. 2, the stored value of TCC when these program steps are performed will be 125. And the stored value of the updated corrected actual position signal TCP from steps 011-015 will be:

$$TCP = TAC - TOC = 115 - (-5) = 120 \quad (2')$$

Then, when the computations at steps 019 through 023 occur, the amount of drift is determined by the parenthetical term in Equation (3) and this is added to the "old" correction number $TOC_o$ to create the "new" value $TOC_n$. In the numerical examle, this becomes:

$$TOC_n = -5 - (125 - 120) = -5 -5 = -10 \quad (3')$$

Thus, the additional drift of −5 since the previous determination of the offset number TOC is brought into effect and the value of the correction number TOC is changed from −5 to −10. An updated and accurate value for the correction number TOC is thus available for use during the next iteration cycle when the computations at steps 011-015 are performed.

Next in the sequence of the program, the command number TCC is produced to agree with the newly received tool selection code value. As noted earlier, commanded position numbers are made to fall within a range of 000 to 999, whereas in the present exemplary system, turret or tool selection codes are expressed as T01, T02, T03 . . . T08. Also, for the specific arrangement here described it is assumed that the turret can have any of eight equally spaced index positions, but the invention may be practiced in controlling movable members which are locatable in fewer or greater than eight equally spaced index positions. To make this possible, the T number which has been newly received is converted by computations at steps 024 through 031 into a TCC command number through the use of a constant N which is held in storage but is changeable to represent the predetermined number of index positions at which the movable member may be located. In the present exmample of an eight position turret, the number N is stored with a value of 8. In order to prevent any problems with rounding off of significant digits in the computer's computations, the number TCC is determined from the T code according to the following equation:

$$TCC = \frac{\frac{2000(T-1)}{N} + 1}{2} \quad (4)$$

Having assumed above that the turret is residing at station No. 2 (and that the previously existing value of TCC was 125), it may be assumed that the new value of the T number is 04, designating that the turret is to be moved from station No. 2 to station No. 4. By the sequence of arithmetic operations described in Table I at steps 024 through 031, it will be seen that a new value of TCC in these exemplary circumstances is formed as follows:

$$TCC = \frac{\frac{2000(4-1)}{8} + 1}{2} = 375.5 \quad (4')$$

Only the first three digits of the answer are stored as a new value of the TCC command, the latter thus becoming equal to 375 — and commanding movement of the turret to station No. 4.

At the next step 032, the computer in following the instruction pulled from memory simply sends a signal through the interface 71 to clear the flip-flop $FF_{nt}$. This is a way of designating in the system that the newly received T code has been utilized, and that it will not be necessary to repeat the computations at steps 019 through 031 until another and different T code is later received.

At step 033, the computer sends a signal to the flip-flop 68 to set the latter and thus make the signal FFZhd m equal to a binary "1". Since a new T code has been received, and a new value of TCC has been formed, it is known that the turret must move from its previous to its new index position; and the existence of a binary "1" signal from the flip-flop $FF_m$ signifies that the turret will be moved or is moving toward a new position.

The apparatus then proceeds to program step 034 through 037. Here a determination is made as to the error between the commanded position TCC for the turret and the corrected actual position TCP of the turret, in order that the latter can be moved until the corrected actual position is reduced substantially to zero, i.e., until the turret is brought to within a predetermined proximity of the newly desired index position. Specifically, a determination is made as to whether |TCC − TCP| is less than a predetermined bandwidth constant B, where B is a stored constant designating the tolernace within which the turret may be located relative to an index position in order for the disengageable coupling 26 to guidingly engage and lock up when it is actuated. In a typical example, the bandwidth constant B may have a value of three on the turret path scale of 000 to 999. As indicated in Table I, in order to determine whether the turret is or is not at such a new location that it will lock up in the commanded index position, the number TCC is read into the cleared accumulator on step 035; the number TCP is read in subtractively on step 036; and on step 037 the result is forced to have a positive sign and the number B is read in subtractively. This is a comparison to determine whether or not:

$$|TCC - TCP| < B \qquad (5)$$

If the result of this computation is positive, this is indicative that |TCC − TCP| is greater than the tolerance B; but if the result is negative, it is an indication that |TCC − TCP| is less than the tolerance B. At step 037, therefore, if the accumulator sign is positive indicating that the turret has not yet reached the newly desired index position with sufficient proximity that the coupling means can be successfully engaged, the system proceeds to steps 038 and 039.

At step 038 the computer causes the flip-flop $FF_{tuc}$ to be set (or leaves it set if it is already in that state); and at step 039 the computer causes the flip-flop $FF_{tmr}$ to be set (or leaves it set if it is already in that state). In these circumstances, an input to the driver amplifier 95 (FIG. 5) is first created so that the valve solenoid TMC is excited and the valve 28 is actuated to release the disengageable coupling 26, freeing the turret for rotational movement. Secondly, a signal from the flip-flop $FF_{tmr}$ provides an input to the amplifier 96 so that the valve solenoid TMR is excited and the turret-driving motor 21 (FIG. 2) runs to rotate the turret and move it along the path. Thus, when a new T code has been received and a new position command valve for TCC is created, the turret is first unclamped and then rotationally driven.

As the turret is being moved by the enrgized motor 21, the sub-routine depicted in FIG. 6 and Table I will be repeated many times (e.g., every 32 milliseconds). Thus, as the turret moves from its previous indexed position toward the newly desired index position, a determination is repeatedly made as to whether or not the turret has come to within that limited range of locations in which the turret may be stopped and the coupling device 26 successfully engaged to guide the turret exactly to the desired index position. In these repeated iterations of the program, steps 001 through 003 will always be performed so that the feedback signal TAC from the counter 74 changes as the turret is moving. The progress through the program will result in skipping from step 005 to 011 because the flip-flop $FF_{su}$ is in its reset state. Thus, the computations or dynamic changing of the corrected feedback position TCP will be performed at steps 011 through 015 as the feedback number TAC progressively changes, but these computations will always use the offset correction number TOC previously established when program steps 019 through 023 were carried out during the initial iteration following a change in the T code. At step 016 in these repeated iterations while the turret is moving, it will be found that the new T code flip-flop $FF_{nt}$ is in its reset state (that flip-flop having been cleared during an earlier iteration step 032) so that the computer proceeds from step 016 to step 017. At steps 017 and 018 the output signal from the "move flip-flop" $FF_m$ is sensed. If the turret is not moving, the latter flip-flop will be in its reset state and producing a binary "0" output signal, whereupon the program skips to step 043 and the computer exits from the sub-routine back to the main program until the next interrupt signal appears. With the assumption that the turret is moving toward a newly desired index position, however, the programmed computer skips from steps 017, 018 to step 034 where the comparing operating previously described is repeated. If it is found that the difference between the commanded position and the corrected actual position (TCC − TCP) is still greater than the lockup tolerance B, then the system continues through steps 038 and 039 to exit from the sub-routine at step 043. The production of signals, tending to set the flip-flops $FF_{tuc}$ and $FF_{tmr}$ at steps 038 and 039, has no effect since these flip-flops were previously driven to their set states in order to initiate release of the coupling 26 and energization of the motor 21. Thus, repeated iterations of the program occur — until at some later iteration, and due to movement of the turret, the comparison operation at steps 034-037 results in a finding that the accumulator sign is negative, i.e., that the turret's actual position TCC is within the tolerance bandwidth B. Thereupon the system skips from step 037 to step 040. At the latter step, the flip-flop $FF_{tmr}$ is reset. Thereafter, during steps 041 and 042 the flip-flops $FF_{tuc}$ and $FF_m$ are similarly cleared or reset, and the system exits from the sub-routine at step 043. When these latter sequences occur, the input signals to the amplifiers 95 and 96 are removed so that the valve solenoid TMR is first deenergized to turn off the motor 21, and then the valve solenoid TUC is deenergized to actuate the coupling 26 and guidingly lock up the turret precisely at the desired index position. Also, when the turret has ceased movement because it has reached the desired position, the flip-flop $FF_m$ is cleared. Thus, as iterations through the sub-routine program continue, the operations designated at steps 001 through 004 are performed, the operations at steps 011 through 016 are performed and the operations at steps 017, 018 are performed to reach the exit step 043. The system merely continues to sense and signal the turret's actual position by generating the number TAC in the counter 74 and to compute the corrected actual position number TCP based upon the presently existing value of the correction number TOC.

If later in the operation of the numerical control system a new block of contouring command data is transferred from the data buffer memory to the active data memory, and that new block contains a T code, the number in the T register will be changed and the "New T flip-flop" $FF_{nt}$ will be set to its "1" state. When this occurs, the sub-routine program will proceed from step 016 to step 019 and thence through steps 034, 038, 039 and 043. It is at this time that a new and updated value for the offset correction number TOC is formed by execution of steps 019 to 023. This happens before the turret begins moving toward the next-commanded index position so that any drift or inaccuracy in the feedback number TAC which has arisen will be taken into account by the new value of the offset correction TOC. The comparison operation at steps 034–037 will thus be accurately performed so that the turret is moved very closely to within the newly desired index position before an attempt is made to reactuate the clamping means.

AN ALTERNATIVE TURRET CONTROL PROGRAM

Figure 7:
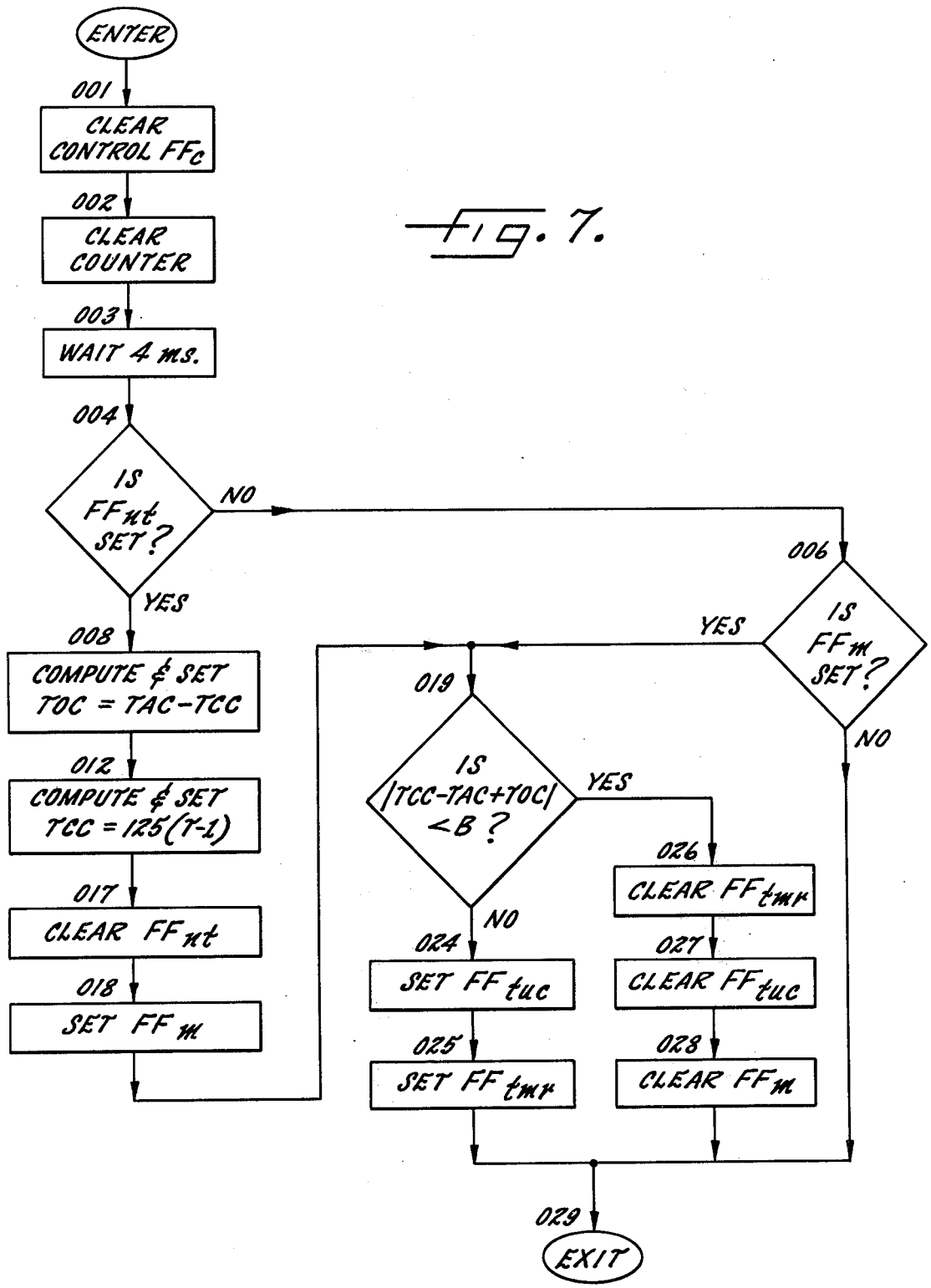
FIG. 7 is a flow chart of an alternative master program for the system of FIG. 5.

It is, of course, feasible to create a wide variety of specifically different programs to condition the apparatus of FIG. 5 so as to embody and practice the present invention. To illustrate this, an alternative program is depicted in FIG. 7 and listed in Table II which appears for convenient reference at the end of this specification. The alternative sub-routine program is somewhat similar to that of FIG. 6 and Table I but it is both shorter and simpler in that it does not require the use of the corrected position number signals TCP nor the use of the startup flip-flop $FF_{su}$. There are only two requirements when the apparatus of FIG. 5 is conditioned by the program of Table II for initially placing the turret control system into operation. The first requirement is that the turret 14 be locked up in one of its known index positions when the control system is initially put into use. With the computer 50 in FIG. 5 functioning, the operator then simply enters through the MDI unit 76 a TCC number which is the commanded position value corresponding to the index position at which the turret then resides. Secondly, the operator manually enters a signal through the MDI unit 76 to set the "new T" flip-flop $FF_{nt}$ so that the apparatus and the computer program upon their initial program cycle will act as if a new T code has been received.

Steps 001–003 in FIG. 7 and Table II are identical to those described earlier with reference to FIG. 6 and Table I. Thus, at the conclusion of step 003 of every iteration of the FIG. 7 program, an updated value for the feedback signal TAC is formed and ready for use in the counter 74. This occurs, as noted above, every thirty-two milliseconds.

Steps 004, 005 in Table II are the same as the steps 015, 016 shown and described above in Table I. In the execution of these steps, it is determined whether or not there has been a change in the commanded T code number. This is done in order to update the stored value of a correction offset TOC just before movement of the turret begins toward a newly desired index position. But if a new T code has not been received when steps 004, 005 is reached in FIG. 7 and Table II (and this is indicated if $FF_{nt}$ is in its reset state), then the programming sequence within the computer proceeds to steps 006, 007 where a determination is made as to whether the "move flip-flop" $FF_m$ is in the set or reset state, — in exactly the same fashion as described earlier with regard to steps 017, 018 in FIG. 6 and Table I. In the first case (when $FF_m$ has been found in its set state), the program of Table II and FIG. 7 skips to steps 019–023 where a determination is made as to whether the turret has come to within a predetermined distance of the newly commanded index position. In the second case (when $FF_m$ is found reset), the program skips to step 029 and the system exits to the main program of the numerical control system.

Steps 008 through 016 in Table II and FIG. 7 replace the steps 011–015, 019–023 and 024–031 of Table I and FIG. 6. The steps 008 through 011 in FIG. 7 constitute a very straightforward way of determining the instantaneous value of a correction number TOC just prior to initiation of turret movement in response to the reception of a new tool-selecting T code.

More specifically, on steps 008 through 011, the thenexisting value of the possibly (and probably) inaccurate position feedback signal TAC (formed at the end of the earlier step 003) is read into the cleared accumulator associated with the computer ALU. The then-existing turret position command number TCC is next read in subtractively. The result is stored as a fresh and updated value of the correction number TOC, according to the formula:

$$TOC = TAC - TCC \qquad (1)$$

It is to be noted specifically that when the foregoing computation is performed at these steps 008–011, the turret is at that instant in the locked-up position corresponding to the value of command number TCC which has been used earlier to drive the turret to its presently-obtaining, precisely locked up and known index position. The value of the number TCC employed at steps 008–011 thus represents not only the previous position command but also the present, true and actual position of the turret. Therefore, the computations performed to produce the signal TOC at steps 008–011 result in an extremely accurate signaling of a correction number value which takes into account all drifts and errors which may have occurred in the feedback circuitry and the resolver 44 up to that point in time.

The computations performed at steps 012 through 016 in FIG. 7 and Table II are a simplified version of the computations carried out at steps 024–031 in FIG. 6 and Table I. More specifically, it is assumed in Table II and FIG. 7 that the controlled member is movable to eight equally spaced positions along a given path is being controlled so that when a T code having any value of 1 through 8 is received, the corresponding position command number TCC should have a value which can have eight equally spaced values between 000 and 999. For this purpose, the constant 125 may be stored in the computer memory, and the correct value of TCC for any given value of the selection code number T may be computed according to the simple formula:

$$TCC = 125 (T-1) \qquad (6)$$

It will be seen that if the effective T code is T01 or T04, for examle, then the value of the command number TCC will respectively be stored as 000 or 375 after the execution of program step 016.

Steps 017 and 018 in Table II and FIG. 7 correspond identically to steps 032 and 033 in FIG. 6 and Table I.

They are performed for the same reasons explained above.

Steps 019 through 023 in FIG. 7 and Table II represent a modified version of steps 034-307 as they appear in FIG. 6 and Table I. It will be seen from Table II that a value for the position error (i.e., the difference between the newly commanded position and the corrected actual turret position) is computed and then compared with the bandwidth tolerance B. Of course, the desired or commanded turret position is now represented by the stored number TCC. On the other hand, the actual position of the turret — compensated for any drift or discrepancy in the feedback signal TAC — is represented by the quantity (TAC − TOC), where TOC is the correction number previously computed and stored during steps 008-011. Thus, the position error between the commanded position and the true actual position may be computed as:

$$\text{Position error} = TCC - (TAC - TOC) \tag{7}$$

which may be restated in equivalent form:
$$\text{Position error} = TCC - TAC + TOC \tag{7'}$$

Therefore, at the end of program step 022, the accumulator holds a number representing the position error, that is, the difference between the commanded turret position and the actual turret position, the latter being corrected for drift or inaccuracy in the feedback signal TAC.

At step 023 this position error number in the accumulator is forced to have a positive sign, and the tolerance or bandwidth constant B is read in subtractively, to determine whether or not:

$$|TCC - TAC + TOC| < B \tag{8}$$

If the answer in the accumulator is positive, this signifies that the position error is greater than or equal to the bandwidth B; and conversely if the answer in the accumulator is negative, it signifies that the position error is less than the bandwidth B.

In the former case, the turret must be moved (or must continue moving) until it more closely approaches the commanded position. Accordingly, the program proceeds from step 023 through steps 024 and 025 at which the flip-flops $FF_{tuc}$ and $FF_{tmr}$ are respectively set before the system exits at step 029 to the main program. Thus, during the first cycle through the sub-routine after a new T code has been received, the valve solenoids TUC and TMR are energized (as explained in greater detail above) so that the releasable coupling 26 is disengaged, and the motor 21 is energized to drive the turret along its path.

During any subsequent cycle following the receipt of a new T code, and while the turret is moved, step 019 is reached by entry from step 007 since the flip-flop $FF_m$ is then in its set state. The system proceeds through steps 024 and 025 but their result is simply to leave the flip-flops $FF_{tuc}$ and $FF_{tmr}$ in their already set state so that the solenoids TUC and TMR remain energized.

As the turret continues to be moved toward the currently commanded position TCC, there will come a time when the position error is reduced below the magnitude of the bandwidth B. Thus, during one of the iterations of the sub-routine the system will skip from step 023 to step 026. Thereupon the flip-flops $FF_{tmr}$, $FF_{tuc}$ and $FF_m$ will all be cleared during steps 026, 027, 028 — and the system will then exit at step 029 to the main program. When this occurs, the solenoids TMR and TUC will be deenergized so that the motor 21 stops and the coupling 26 is reengaged bto guide and lock up the turret precisely at the commanded index position.

The clearing of the flip-flop $FF_m$ will result in subsequent iterations of the sub-routine proceeding from steps 001-005 to steps 006 and 007 and then exiting at step 029; and such shortened executions of the sub-routine will continue until a newly commanded turret position is desired, as represented by a new value of the T number and the setting of the flip-flop $FF_n$. When that later occurs, then the system will proceed from steps 004, 005 through steps 008-025 and the operations described above will occur again. Of course, when this happens an updated value for the correction number TOC will be formulated and stored on step 011 and therefore the comparison performed at steps 019-023 will be valid and accurate even though the feedback signal TAC derived from the resolver 44 and its associated circuits has in the meantime drifted or changed due to any factor such as temperature variations.

In the description of FIGS. 2 and 5, the motor 21 has been treated as unidirectional so that it always drives the turret in the same direction. If that direction is clockwise, and the turret is commanded to move from station No. 5 to station No. 4, the turret will be driven through ⅞ths of a revolution to reach the new position. This is not objectionable since the turret is driven sufficiently fast that undue time (in that extreme case) is not consumed. It will be easily possible, and apparent to one skilled in the art, to make the motor 21 bidirectional and to turn it on through a forward or reverse solenoid valve. Those valves may be controlled according to the sign of the position error (the quantity TCC − TCP in the case of FIG. 6 or the quantity TCC − TAC − TOC in the case of FIG. 7) so that the turret is driven in the direction of the shortest distance to the commanded position until the error is reduced below the bandwidth B of the releasable coupling 26.

EQUIVALENT ANALOG EMBODIMENTS

Although it is preferred to practice the methods and apparatus of the invention by utilizing a programmed digital computer, it is in no way essential that a digital computer, or a software program therefor, be employed to achieve the advantageous apparatus and operations. To make this clear, FIG. 8 is a schematic diagram of an analog embodiment which is the full equivalent, and which may be constructed as an alternative to, the digital embodiments described above with reference to FIGS. 2, 5 and 6 or 7. Those skilled in the art will recognize from the following description that the system of FIG. 8 straightforwardly incorporates the concepts described above, and by known analog techniques functions in substantially the same way to produce substantially the same results by counterpart analog apparatus.

In the arrangement of FIG. 8, the means for rotationally moving the turret 14 is a reversible dc. motor 21' having windings 21a, 21b which when respectively energized cause driving of the turret in a clockwise (c.w.) or counterclockwise (c.c.w.) direction. The turret is selectively locked or released by the releasable coupling 26 with a solenoid and armature arrangement, in lieu of the hydraulic piston structure shown in FIG. 2. Specifically, the turret body is fixed to an armature associated with two solenoids TUC and TC which when respectively energized shift the turret axially away from or toward the slide 20 so as to separate or engage the two parts of the coupling 26.

In the analog system of FIG. 8, a selector switch 100 may be manually moved by the machine tool operator to any of eight positions to call for movement of the turret 14 from any presently existing index position to any other one of the assumed eight possible index positions. The switch 100 includes a hand knob 101 ganged to switch wipers 102, 103. When the knob is set to any of its positions 1 through 8, the wiper 101 will thus contact the corresponding one of a plurality of switch points 104 at the junctions of eight equal-valued resistors 105 forming a voltage divider connected between lines $L_1$ and $L_2$ leading from a suitable dc. voltage source. For convenience of explanation may be assumed that the voltage source line $L_1$ resides at + 100 volts dc. relative to the reference or ground line $L_2$. The switch 100 with its wiper 101 and the voltage divider formed by the resistors 105 thus constitute a means for creating a command signal which by its value represents a desired one of the plurality of predetermined turret index positions. More specifically, as the wiper is moved to its switch contact positions 1 through 8, in the exemplary arrangement here shown, the wiper will reside at different voltage levels of 0 volts, 12.5 volts, 25.0 volts ... 87.5 volts. That voltage on the wiper may be considered as a turret command position signal $TCC_n$. In the present example, as the turret is commanded to reside in any one of its stations No. 1 through No. 8, the command signal $TCC_n$ takes on increased multiples of a voltage increment equal to 12.5 volts, such that $TCC_n = 12.5 (T-1)$, where T denotes the numerical position of the knob 101. Of course, power means (not shown) may be provided to adjust the switch knob to any desired position No. 1 through No. 8 in response to receipt of an electrically signaled selection code T01 through T08, if it is desired to eliminate the manual setting of the selector switch.

The wiper 103 ganged to the knob 101 will intermittently wipe across and form a circuit through successive stationary contacts 106 when the switch 100 is moved. The wiper 103 is connected through a relay coil ECR and any of the contacts 106 from line $L_1$ to line $L_2$. Thus, the relay ECR will be momentarily picked up (at least once) whenever the knob 101 is turned from any given position to any other of its eight possible positions. This momentary actuation of the relay ECR enables the determination of a new and updated correction signal, as hereinafter explained.

As a means for creating a feedback signal TAC representing the actual position of the turret 14, the latter is mechanically coupled to the wiper 108a of a rotary potentiometer 108 connected across a separate voltage source schematically represented by a battery 109. Assuming the battery voltage to be 100 volts, the feedback signal TAC appearing on the wiper 108a will take on values of 00.0 to 99.9 as the turret moves clockwise from its home position (station No. 1) through almost a full revolution. Ideally, the feedback voltage would take on values of 00.0, 12.5, 25.0, 37.5 ... 87.5 as the turret resides at angles of 0°, 54°, 90°, 135° ... 315° displaced from home, i.e., at station Nos. 1, 2, 3, 4 ... 8. The feedback voltage may be subject to offset or inaccuracy, however, even if the voltage from battery 109 is stable. For example, the wiper 108a may be offset when coupled to the turret such that in the No. 3 station of the turret, the voltage TAC has a value of 31 volts rather than the ideal value of 25 volts. Moreover, the wiper 108a might conceivably slip relative to the turret during operation, or any amplifier (not shown) used to increase the potentiometer signal before its application to a closed loop positioning servo system might change with aging or temperature variations to introduce drift or inaccuracy.

Such feedback signal inaccuracies are automatically eliminated by the system of FIG. 8 now to be described.

To provide a suitable means for producing a correction voltage signal TOC, a sample and hold (S&H) circuit 110 is arranged to receive an input voltage whenever relay contacts ECR1 (controlled by coil ECR) are momentarily closed. A variety of suitable sample and hold circuits are well known in the art, so that the details thereof need not be set forth here. Such circuits are coupled to appropriate positive and negative supply voltage sources (not shown) and function to maintain at their outputs the voltage last-received at their inputs — until a new and different input voltage is introduced. In the present instance, the output from S&H circuit 110 is a voltage representing a correction value TOC.

In order to compute the correct, up-to-date value for the voltage $TOC_n$, despite previous drifting of the feedback signal TAC, a second S&H circuit 111 is used to signal the last-received commanded position signal TCC. The manner in which the latter signal is fed to the S&H circuit 111 will become clear later. As a means for deriving the correction signal $TOC_n$, the TCC signal voltage is applied to the inverting input and the feedback voltage TAC is applied to the noninverting input (via equal input resistors) of an operational amplifier 112 having a negative feedback resistor 113. The amplifier is conventionally connected to positive and negative supply voltage sources (not shown) and in well known fashion functions as an algebraic summing device. Those skilled in the art will understand fully that the amplifier 112 produces an output voltage $TOC_n$ which in polarity and magnitude corresponds to the difference between the input signals TAC and TCC. That is, the dc. voltages have the relation:

$$TOC_n = TAC - TCC \tag{1a}$$

which is identical mathematically to Equation (1) set out above.

The signal voltage $TOC_n$ at the output of amplifier 112 may change any time either input TAC or TCC varies, but this will not affect the output voltage $TOC_o$ from S&H circuit 110. Each time the contacts ECR1 momentarily close, however, the then-existing value of $TOC_n$ becomes the new value of $TOC_o$. As will become apparent hereinafter, the amplifier 112, the S&H circuit 110 and the controlled relay contacts ECR1 form means operative only when the turret is locked in an index position for producing and storing the correction signal $TOC_o$ which takes into account any discrepancy then existing in the feedback signal TAC.

The embodiment of FIG. 8, like the embodiment of FIG. 5, includes means responsive to a change in the command signal (voltage $TCC_n$) for moving the turret 14 along its path until the difference (TAC-TOC) between the feedback signal TAC and the correction signal TOC becomes approximately equal to the new value of the command signal $TCC_n$, or less than the lock-up bandwidth B of the releasable coupling 26. Such means here include an operational amplifier 114 connected to act as an algebraic summing device which computes and signals the position error ERR between the corrected actual position and the commanded position. The amplifier 114 has three input resistors to receive the signals TCC, $TOC_o$ and TAC as two positive and one negative inputs. With the negative feedback resistor 115, the amplifier 114 in known fashion acts to make its output voltage ERR in value and polarity conform to the relation:

$$ERR = TCC + TOC_o - TAC = TCC - (TAC - TOC_o) \quad (7a)$$

This is the same expression as set out in Equation (7), supra. As the turret moves c.w. or c.c.w., the signal TAC will increase or decrease, and the error signal ERR will become smaller as the turret approaches the commanded position represented by the voltage TCC.

The error signal ERR is supplied to a polarity detector in the form of a voltage-comparing high gain operational amplifier 116 which operates to provide a fully saturated (maximum positive or maximum negative) output. As shown, the voltage ERR is applied to the amplifier's non-inverting input, while the inverting input is connected to zero volts (ground) potential. The output voltage $E_d$ is therefore positive when the error voltage ERR is positive (greater than zero) or is negative when the error voltage is negative (less than zero). To control the direction in which the turret motor 21' runs, that output is applied through forwardly and reversely poled diodes 118 and 119 to coils of relays RCW and RCCW having normally open contacts RCW1 and RCCW1 in series with the motor windings 21a and 21b. If the error ERR is positive or negative in sign, the relay RCW or RCCW will be picked up, and the motor 21' will be conditioned to run in a c.w. or c.c.w. direction, respectively. This alone will not energize the motor 21', however, because normally open contacts RTMR1 are disposed in the series circuit common to windings 21a, 21b between lines $L_1$ and $L_2$.

In order to unclamp the turret and to energize the motor 21' to move the turret toward a commanded position when the error is greater in magnitude than a predetermined tolerance or bandwidth B, the error voltage ERR is also fed to an absolute value amplifier 120. Such amplifiers are per se known in the art; they produce an output signal of positive polarity and of magnitude equal to the input voltage but regardless of whether that input is positive or negative. The absolute magnitude output voltage $E_a$ from amplifier 120 is fed to another operational amplifier 121 functioning in the saturating mode as a comparator, and receiving on its inverting input a reference voltage $E_b$ representing the bandwidth B. If $E_a > E_b$, the output $E_r$ of amplifier 121 has its maximum positive value; and if $E_a < E_b$, that output has its maximum negative value. A forwardly poled diode 122 leading to a relay RR thus permits the latter to be energized only when $E_a > E_b$, and this means that relay RR is actuated except when $$|ERR| < E_b, \text{ that is, } |TCC - (TAC - TOC)| < B \quad (8a)$$

where B is a predetermined value representing the lock-up bandwidth of the coupling 26. If the engagement bandwidth of the coupling 26 is ±3 parts in 1000, then the voltage $E_b$ may have a value of 0.3 volts in the specific example here described. It will be seen that Equation (8a) is the same as Equation (8), supra.

Relay RR has normally open contacts RR1 and RR2. Assuming for the moment that contacts MR2 have been closed, actuation of contact RR1 connects the coils of relays RTUC and RTMR across the supply voltage on lines $L_1$ and $L_2$. Relay RTUC is a time delay drop out relay; and relay RTMR is a time delay pick-up relay. Thus, when the condition of Equation (8a) is not satisfied, relay RTUC first picks up and relay RTMR then actuates after a short time delay.

Actuation of relay RTUC opens contacts RTUC1, and closes contacts RTUC2. This deenergizes solenoid TC and excites solenoid TUC, so the turret coupling 26 is released.

Actuation of relay RTMR closes contacts RTMR1 so that motor winding 21a or 21b (depending upon the sign of the ERR voltage then existing) is excited —and the motor 21' drives the turret in one direction or the other toward the commanded position represented by the voltage TCC.

Of course, when the movement of the turret and its change of position results in the condition of Equation (8a) being satisfied, then contacts RR1 open, relay RTMR drops out to stop the motor 21', and after a short delay relay RTUC drops out so that solenoid TUC and TC become respectively deenergized and energized —and the coupling 26 is re-engaged to lock the turret at the new index position.

The relay ECR mentioned earlier forms a means to initiate a fresh or updated computation and signaling of the correction voltage $TOC_o$ in response to a change in the commanded or desired position signal. It will momentarily actuate (at least once) by current flow through the wiper 103 whenever the knob 101 is turned by the operator to select a newly desired index position for the turret. The relay MR is a "move relay" which initiates the sequence of operations after the knob 101 has been set to a new position. Relay MR is picked up by closure of contacts EN2 when a double-contact push button switch ENTER is momentarily depressed by the operator after he has moved the selector knob 101 to a new position. Contacts EN1 of that same switch will momentarily close to transfer the command signal voltage $TCC_n$ into the S&H circuit 111 so that the command signal TCC is thereafter equal to the newly selected value. A single contact push button switch INITIAL performs this latter function when the system is first put into operation, in order to create the proper initial value for the correction signal $TOC_n$.

With the foregoing in mind, the operation of the apparatus of FIG. 8, and the method steps which it carries out, may be understood from the following narrative sequence. Before the system is put into operation (i.e., before power is turned on), the turret 14 will be locked up in one of its predetermined index positions. The motor 21' and the solenoid TUC cannot be energized when power is first turned on (even if the voltage ERR is relatively great) because the move relay MR is then deenergized and its contacts MR2 prevent actuation of relays RTUC and RTMR. The operator first moves the selector switch knob 101 to that position which corresponds to the index station at which the turret then actually resides. Thus, the voltage $TCC_n$ is made equal in value to the actual position of the turret. The potentiometer 108 is at this time producing the feedback signal TAC, but the latter may not be accurate for the reasons noted above, and thus it may not be equal to the voltage $TCC_n$.

The machine tool operator then momentarily pushes the INITIAL switch. The voltage $TCC_n$ is therefore stored in S&H circuit 111 and becomes the value for the command signal TCC. The summing operational amplifier 112 at this time thus produces an output $TOC_n$ which is equal to TAC−TCC, i.e., a correction voltage which represents the difference between the known actual position TCC and the actual position represented, possibly with inaccuracy, by the feedback signal TAC.

After such initializing, the selector switch 11 may be moved from time-to-time to various ones of its eight positions to call for relocation of the turret at different desired index positions. To speak in terms of a specific example, let it be assumed that the switch 100 and the turret are both at station No. 4. $TCC_n$ and TCC will both be 37.5''; but we may assume that the feedback voltage TAC is 30'' due to offset or inaccuracy. In these circumstances, the voltage $TOC_n$ from amplifier 112 will be:

$$TOC_n = TAC - TCC = 30 - 37.5 = -7.5'' \quad (1a')$$

Assume further that the operator now moves the selector switch from position No. 4 to position No. 6. As this is done, relay ECR momentarily actuates as wiper 103 moves across one of the contacts 106. The contacts ECR1 momentarily close to transfer the voltage $TOC_n$ into S&H circuit 110, and (in the example stated) its output $TOC_o$ becomes a stored value of −7.5''.

The operator then momentarily depresses the ENTER switch, and the following take place:

a. Contacts EN1 close to transfer $TCC_n$ into S&H circuit 111, and the voltage TCC thus becomes 62.5''. This makes amplifier 112 change the value of voltage $TOC_n$, but that has no effect on the stored voltage $TOC_o$ because contacts ECR1 are open.

b. Contacts EN2 close to energize relay MR. Its contacts MR1 close so that relay MR is sealed in (when contacts RR2 almost immediately close, as noted below). The contacts MR2 are thus held closed to enable the circuit for relays RTUC and RTMR.

c. As soon as the voltage TCC changes to 62.5'' —as noted at (a) above—, the amplifier 114 changes the error voltage ERR, which becomes:

$$ERR = TCC - (TAC - TOC) = 62.5 - 30 + (-7.5) = 40''$$

d. The output $E_d$ of amplifier 116 becomes fully positive, so that relay RCW (but not RCCW) picks up to close contacts RCW1.

e. Also, since the voltage $E_a$ is +40'', and therefore greater than the bandwidth voltage $E_b$ (assumed to be 0.3 volts), the voltage $E_r$ becomes large and positive, so relay RR picks up. All of this happens very quickly after the ENTER switch is pushed, so contacts RR2 close to seal in relay MR before that switch is released to re-open contacts EN2.

f. Pick up of relay RR closes contacts RR1, so relay RTUC is immediately actuated, and relay RTMR picks up after a short delay. For the reasons noted above, solenoid TU is thus turned off, solenoid TUC is excited to unclamp the turret, and motor winding 21a is energized to make the motor 21' drive the turret c.w. (from station No. 4 toward station No. 6).

g. As the turret moves c.w., the feedback signal TAC from potentiometer 108 increases. The condition of Equation (8a) is ultimately satisfied just after the voltage TAC increases beyond the point at which:

$$ERR = TCC - (TAC-TOC) = 62.5 - TAC + (-7.5) = E_b = 0.3 \ TAC = 54.7''$$

Therefore, when TAC becomes greater than 54.7 volts, the voltages ERR and $E_a$ fall below 0.3'' and the voltage $E_r$ swings negative, so relay RR drops out.

h. In consequence, contacts RR1 and RR2 open to deenergize relays RTUC, RTMR and MR. RTUC drops out after a slight time delay. The turret is thus stopped within the coupling tolerance B at station No. 6, and the coupling 26 engages to force the turret precisely into its No. 6 station. The command voltage TCC which brought the turret to this position now accurately represents the actual position of the turret, and as the signal TAC drifts or changes (from the original discrepancy of −7.5'') the amplifier 112 will make the signal $TOC_n$ change to remain an accurate representation of the feedback signal error.

The apparatus of FIG. 8 is ready — at any later time — to reposition the turret at another index position in response to the operator moving the selector switch and pressing the ENTER switch. Only when that occurs is the signal $TOC_o$ updated and stored to agree with $TOC_n$, so that all drifts or changes in the voltage TAC up to that point in time are reflected in the correction signal $TOC_o$ when the turret is actually being moved. Yet, in FIG. 8 (as in FIG. 5 taken with FIG. 6 or FIG. 7) the correction signal $TOC_o$ used during movement of the turret cannot change while the turret is actually moving.

AN ALTERNATIVE ANALOG ARRANGEMENT

The analog apparatus of FIG. 8 most closely corresponds to the digital embodiment described above with reference to FIGS. 2, 5, 7 and Table II. This is so because the system of FIG. 8 compares an algebraically formed signal ERR representing |TCC − TAC + TOC| with the bandwidth B, this being the effect of the comparator amplifier 121. The same comparison is performed at steps 019-023 in FIG. 7 and Table II.

In FIG. 5 taken with FIG. 6 and Table I, however, a corrected actual position signal TCP is created such that TCP = TAC − TOC; and the accurate position error |TCC − TCP| is compared with the bandwidth B to determine whether the turret coupling should be engaged or released (and the turret motor turned off or on). These FIG. 6 and FIG. 7 arrangements are fully equivalent to each other and to FIG. 8. Yet, an analog equivalent may be constructed to conform even more closely to FIG. 5 taken with FIG. 6 and Table I.

To do this, that portion of FIG. 8 within the dashed line enclosure 125 may be replaced by the devices shown in the enclosure 125a illustrated in FIG. 9. As there shown, the voltage signal TCC is fed as one input to the summing amplifier 112, but the latter receives other input signals $TOC_o$ and TCP, where TCP is a voltage which in value represents the corrected actual position of the turret. The output voltage from amplifier 112 thus takes on the value:

$$TOC_n = TOC_o - (TCC - TCP)$$

Compare the equation shown in FIG. 6 at steps 019-023. The old correction number $TOC_o$ is changed to a new value, the change being by the amount of the difference between TCC and TCP when the turret is locked in a known position.

In FIG. 9, when the "enable correction" relay ECR momentarily closes contacts ECR1 to store the $TOC_n$ voltage in S&H circuit 110, it opens normally closed contacts ECR2 to interrupt the feedback of the voltage $TOC_o$ to an additional S&H circuit 130. Thus, normally the voltage $TOC_o$ is fed directly back from circuit 110 to the input of amplifier 112, but when circuit 110 is being "updated", the $TOC_o$ input to amplifier 112 is "frozen" by the S&H circuit 130. The result of this is that before any commanded movement to a new index position begins, the correction voltage $TOC_o$ is freshly updated such that it becomes equal to the then-existing correction $TOC_n$, where $$TOC_n = TOC_o - (TCC - TCP).$$

In order to create the corrected actual position signal, the correction signal and the feedback signal TAC are algebraically combined in an operational amplifier 131. The output is:

$$TCP = TAC - TOC_o$$

and thus represents the true actual position of the turret because the feedback signal is corrected by the amount of the determined offset $TOC_o$. Noteworthy is the fact that when the turret is locked up, the signal TAC may drift, thereby changing TCP and changing $TOC_n$. Before the turret starts to move, all such drift as reflected in the voltage $TOC_n$ is incorporated into the signal $TOC_o$. Then when the turret is unclamped and moving, in response to a change in the command signal TCC, $TOC_o$ is prevented from changing and the feedback signal is corrected by the stored amount $TOC_o$ to create the true position signal TCP.

The operational amplifier 115 in FIG. 9 serves to combine only two inputs to create the error voltage ERR, which is the difference between the commanded position TCC and the corrected actual position TCP. Thus, $$ERR = TCC - TCP$$

That error voltage is sent to the comparator 116 and the absolute amplifier 120 as shown in FIG. 8 — and the system otherwise functions in the same fashion to produce the same results.

RESUME'

To recapitulate briefly, it has been made clear that the present invention brings to the art methods and apparatus for controlling a member so that it can be moved along a defined path to different desired or commanded ones of a plurality of predetermined index positions —and in a way which overcomes offset, drift or inaccuracy in a position feedback signal.

The apparatus may be formed, and the methods practiced, by either programmed digital devices or equivalent analog devices. The claims which here follow are all generic to the specific, exemplary and equivalent embodiments described.

In its principle aspects, the invention contemplates creating a position command signal (TCC) which from time-to-time changes to designate a different one of the index positions. Any appropriate means (such as the register TCC in FIG. 5 or the voltage divider 104 and switch wiper 102 in FIG. 8) may be provided to create and change the command signal.

Further, a feedback signal (TAC) is created by sensing the actual position of the controlled member, such signal being subject to offset, drift or inaccuracy. Again, appropriate means (such as the resolver 44 and counter 74 in FIG. 5, or the potentiometer 108 in FIG. 8) are provided to create the changeable feedback signal.

Also, the value of the feedback signal is compared, preferably by an algebraic summation, with the signal representing the actual position of the member when it is known to be exactly in one of its index positions —to create a correction signal (TOC) designating the then-existing discrepancy in the feedback signal. Appropriate means (a digital computer with program control and memory registers in FIG. 5, or corresponding algebraic analog signal processing and storing circuits in FIG. 8) are provided to create such signal according to the relation TOC = TAC − TCC. But this step is carried out (and these means are effective) only when the controlled member is in a known position, and they are inhibited when the controlled member is moving.

Finally, the controlled member is moved along the path toward a newly commanded position so long as the difference between the commanded position and the corrected actual position (the feedback position as modified by the signaled correction) exceed a predetermined threshold value (which may be zero or the bandwidth B of a releasable coupling). Means for accomplishing this may take the form of a programmed digital computer and storage registers controlling a motor 21 as in FIG. 5 with FIG. 6 or 7, or the equivalent form of algebraic analog signal circuits controlling a motor 21' as in FIG. 8 or FIG. 9. The relation is such, in any case, that the member is moved —in response to a new command— until the error, which is:

$$ERR = TCC - (TAC - TOC),$$

is reduced in magnitude below the threshold B and such that $$|TCC - TAC + TOC| < B$$

This determination is made digitally by the ALU and storage registers in FIGS. 5 and 6 or 7, and by the comparator 121 in FIGS. 8 and 9 to control the motor 21 or 21'. That determination is the mathematical equivalent of:

$$|TCC - TCP| < B$$

since the corrected actual position signal TCP (created according to FIGS. 5 and 6, or FIG. 9) is equal to (TAC−TOC).

Of course, the signs or polarities of variables represented by digital or analog signals may all be reversed, and the signs in the various equations reversed, to carry out the invention in the same manner. As those skilled in the art will recognize the sign or polarity of the signals, and in the equations set out, may be changed so long as the operations here described are effected.

There follow as the last few pages of this specification the Tables I and II which have been mentioned above, and which are here located for ease of reference.

TABLE I

SUBROUTINE PROGRAM LISTING FOR TURRET POSITIONING CONTROL ACCORDING TO FIGS. 5 AND 6

(a) Enter in response to timed interrupt signal derived from clock every 32 milliseconds.

| | | |
|---|---|---|
| 001 | Set $FF_{cl}$ | ($FF_c$ is cleared) |
| 002 | Clear $FF_{cl}$ | (Counter 74 is reset to zero) |
| 003 | Measure off 4 ms. delay | (After which fresh TAC signal exists) |
| 004 | Clear accumulator | |
| 005 | Read in $FF_{sa}$ Bit<br>If accum. is 0, skip to step 011<br>If accum. is 1, proceed to step 006 | |
| 006 | Clear accumulator | |
| 007 | Read in TAC | |
| 008 | Read in TCC and subtract | |
| 009 | Store answer in TOC | |
| 010 | Clear $FF_{su}$<br>Skip to step 043 | |
| 011 | Clear accumulator | |
| 012 | Read in TAC | |
| 013 | Read in TOC and subtract | |
| 014 | Store answer in TCP | (TCP = TAC − TOC) |
| 015 | Clear accumulator | |
| 016 | Read in $FF_{nt}$ Bit<br>If accum. is 1, skip to step 019<br>If accum. is 0, proceed to step 017 | |
| 017 | Clear accumulator | |
| 018 | Read in $FF_m$ Bit<br>If accum. is 0, skip to step 043<br>If accum. is 1, skip to step 034 | |
| 019 | Clear accumulator | |
| 020 | Read in TOC | |
| 021 | Read in TCC and subtract | |
| 022 | Read in TCP and add | |
| 023 | Store answer in TOC | ($TOC_n = TOC_o − TCC + TCP$) |
| 024 | Clear accumulator | |
| 025 | Read in T | |
| 026 | Read in numerical 1 and subtract | |
| 027 | Read in numerical 2000 and multiply | |
| 028 | Read in N and divide | |
| 029 | Read in numerical 1 and add | |
| 030 | Read in numerical 2 and divide | |
| 031 | Store answer in TCC | $\left\{ TCC = \dfrac{\dfrac{2000(T-1)}{N} + 1}{2} \right.$ |
| 032 | Clear $FF_{nt}$ | |
| 033 | Set $FF_m$ | |
| 034 | Clear accumulator | |
| 035 | Read in TCC | |
| 036 | Read in TCP and subtract | |
| 037 | Set accum. sign positive<br>Read in B and subtract<br>If accum. sign is positive, proceed to step 038<br>If accum. sign is negative, skip to step 040 | |
| 038 | Set $FF_{tuc}$ | (TUC = 1) |
| 039 | Set $FF_{tmv}$<br>Skip to step 043 | (TMR = 1) |
| 040 | Clear $FF_{tmr}$ | (TMR = 0) |
| 041 | Clear $FF_{tuc}$ | (TUC = 0) |
| 042 | Clear $FF_m$ | |
| 043 | Return to MAIN PROGRAM | |

TABLE II

SUBROUTINE PROGRAM LISTING FOR TURRET POSITIONING CONTROL ACCORDING TO FIGS. 5 AND 7

(a) Enter in response to timed interrupt signal derived from clock every 32 milliseconds.

| | | |
|---|---|---|
| 001 | Set $FF_{cl}$ | ($FF_c$ is cleared) |
| 002 | Clear $FF_{cl}$ | (Counter 74 is reset to zero) |
| 003 | Measure off 4 ms. delay | (After which fresh TAC signal exists) |
| 004 | Clear accumulator | |
| 005 | Read in $FF_{nt}$ Bit<br>If accum. is 1, skip to step 008<br>If accum. is 0, proceed to step 006 | |
| 006 | Clear accumlator | |
| 007 | Read in $FF_m$ Bit<br>If accum. is 0, skip to step 029<br>If accum. is 1, skip to step 019 | |
| 008 | Clear accumulator | |
| 009 | Read in TAC | |
| 010 | Read in TCC and subtract | |
| 011 | Store answer in TOC | |
| 012 | Clear accumulator | |
| 013 | Read in T | |

TABLE II-continued
SUBROUTINE PROGRAM LISTING FOR TURRET POSITIONING CONTROL ACCORDING TO FIGS. 5 AND 7

| | |
|---|---|
| 014 | Read in numeric 1 and subtract |
| 015 | Read in numeric 125 and multiply |
| 016 | Store answer in TCC |
| 017 | Clear $FF_{nt}$ |
| 018 | Clear $FF_m$ |
| 019 | Clear accumulator |
| 020 | Read in TCC |
| 021 | Read in TAC and subtract |
| 022 | Read in TOC and add |
| 023 | Set accumulator sign positive<br>Read in constant B and subtract<br>If accum. sign is positive, proceed to step 024<br>If accum. sign is negative, skip to step 026 |
| 024 | Set $FF_{tuc}$ |
| 025 | Set $FF_{tmr}$<br>Skip to step 029 |
| 026 | Clear $FF_{tmr}$ |
| 027 | Clear $FF_{tuc}$ |
| 028 | Clear $FF_m$ |
| 029 | Return to MAIN PROGRAM |

I claim:

1. In a system for selectively moving a member along a path to various ones of a plurality of predetermined index positions, in response to respective index position command signals, for precise lock-up, the combination comprising means for releasably locate-locking said member in any one of said index positions when the member is within a given proximity (B) of that one position, means energizable when said locking means are released for moving said member along said path, means for producing a position command signal (TCC) which from time to time is changed to represent different ones of the predetermined index positions by different predetermined respective values thereof, means for sensing the position of said member and producing a feedback signal (TAC) nominally representing the member's actual position along the path, but said signal being subject to drift and inaccuracy, means operative only when said member is locked in an index position for producing and storing a correction signal (TOC) representing the difference (TAC−TCC) between said feedback signal and the predetermined value for the command signal then obtaining, and means responsive to said command, feedback and correction signals for (a) releasing said locking means, (b) and energizing said moving means when the algebraic sum (TCC − TAC + TOC) of such three signals is in absolute magnitude greater than an amount corresponding to said given proximity (B).

2. In a system for positioning a movable member to various ones of index positions along a path, in response to a position command signal of various respective predetermined values, for positive lock-up precisely at such index positions, the combination comprising means for creating a position command signal (TCC) which from time to time is changed to represent predetermined values designating different respective index positions, means coupled to said movable member for producing a feedback signal (TAC) which changes in value according to the position of said member along the path, said feedback signal being subject to drift and inaccuracy, means responsive to (a) said feedback signal and (b) said command signal for producing a correction signal (TOC) representing the difference between (a) and (b) when said member is locked in a position corresponding to the value of the command signal, means responsive to a change in said command signal from one predetermined value to another for (i) unlocking said member and (ii) driving said member along the path until the difference between said feedback and correction signals (TAC−TOC) becomes approximately equal to the new value of said command signal.

3. In a system for moving a member along a path to various ones of a plurality of index positions for precise lock-up, the combination comprising a. means for releasably locking said member in any one of said index positions, b. means energizable for moving the member along the path when said locking means are released, means for producing a feedback signal which changes according to changes in the position of the member, said feedback signal being subject to drift and inaccuracy, d. means operative when said member is locked in any given index position for comparing said feedback signal with a signal representing a command value for such given position to create a correction signal, e. means for storing said correction signal until a new value thereof is created by the next operation of said last-named means, f. means for creating a command signal indicating by its value the desired position of said member, said command signal being changeable from time to time to represent different ones of said index positions, g. means effective after said command signal has been changed for releasing said locking means and energizing said moving means in that order, and h. means responsive to said command, feedback and correction signals for deenergizing said moving means and actuating said locking means in that order when the difference between said command and feedback signals, as modified by said correction signal, becomes less than a predetermined threshold value.

4. In a system for moving a member along a path to various desired ones of a plurality of index positions, the combination comprising means for producing a command signal which in value represents a given one of said index positions, said command signal being changeable from time-to-time to designate different index positions desired for said member, means for producing a feedback signal which varies according to movement of said member and in value represents the actual position of such member, said feedback signal being subject to drift and inaccuracy, means selectively energizable to move said member along the path, means for creating a correction signal, means responsive to said command, feedback and correction signals for energizing said moving means until the difference between the command and feedback values, as modified by the correction value is less than a predetermined value, means effective after said moving means have been deenergized for shifting said member precisely into the index position closest to the then-existing position of the member, said shifting means having limits of its shifting range capability, and means for comparing (a) said feedback signal value with (b) a signal value corresponding to the index position in which the member then resides, and for setting said correction signal-creating means to make the correction signal equal in value to the difference between (a) and (b), whereby as each successive new command signal value appears, said member is moved to within said shifting limits of the commanded index position, and is shifted to the latter position, despite drifts in said feedback signal.

5. The method of moving a member along a path to any desired one of a plurality of predetermined index positions established by releasable guiding lock means, said method comprising creating a position command signal (TCC) and from time-to-time changing its value to represent different desired index positions, sensing the actual position of said member and creating a feedback signal (TAC) which changes in value according to changes in position of said member, said feedback signal being subject to drift and inaccuracy, utilizing said command signal and said feedback signal each time when said member is locked in an index position corresponding to a value of said command signal to create and store a correction signal which in value represents the difference between the feedback and command signals, changing said member to any new desired index position by changing said command signal to represent the new position, releasing the guide lock means, and moving said member along the path until the difference between the command signal and the feedback signal, as modified by said correction signal, becomes less than a predetermined threshold value, and thereafter actuating the guiding lock means to shift said member precisely into the new desired index position.

6. The method set out in claim 5 further characterized in that said step of creating and storing said correction signal is carried out only after and in response to a change in said command signal and prior to the releasing of said guiding lock means.

7. The method of controlling the motion of a member along a path to various ones of a plurality of index positions at which precise guiding lock-up means are engageable, said method comprising a. sensing the actual position of said member and producing a feedback signal which changes in proportion to changes in actual position, said feedback signal being subject to drift and inaccuracy, b. comparing said feedback signal to a valve representing the index position of the member each time when the member is locked by said lock-up means in that index position to produce a correction signal, and c. changing the position of said member to any different index position by
  i. setting a command signal to a value corresponding to the desired index position,
  ii. releasing said lock-up means,
  iii. moving the member along the path until the feedback signal as modified by the correction signal is approximately equal to the command signal, and
  iv. re-engaging said lock-up means.

8. The method of selectively moving a member along a path to any desired one of a plurality of predetermined index positions, said index positions being precisely established by guiding lock-up means selectively engageable to lock the member in an index position if the member is within a range limit of such position, said method comprising producing a command signal and changing its value from time-to-time to designate different desired index positions to which said members is to be successively located, producing a feedback signal which varies according to changes in the position of said member, said feedback signal being subject to drift and inaccuracy, producing a correction signal, releasing said lock-up means and moving said member along the path until the difference between said command signal and said feedback signal, as modified by said correction signal, is less than a predetermined amount corresponding to said range limit, and thereupon re-engaging said lock-up means, and while said lock-up means are engaged with the member in any index position, setting the value of said correction signal to be equal to the difference between the then-existing value of said feedback signal and the value of the command signal for that index position.

9. The method set forth in claim 8 further characterized in that the last-named step of setting said correction signal is carried out immediately prior to the release of said lock-up means and movement of the member toward a newly commanded index position.

10. The method set forth in claim 9 further characterized in that any change in the value of said correction signal is inhibited while said lock-up means are released and the member is being moved.

11. The method set forth in claim 8 further characterized in that the last-named step of setting said correction signal is inhibited while and whenever said lock-up means are released.

* * * * *